US012236830B2

(12) United States Patent
Wen et al.

(10) Patent No.: US 12,236,830 B2
(45) Date of Patent: Feb. 25, 2025

(54) CALIBRATING INPUT DISPLAY DATA FOR SEAMLESS TRANSITIONS IN MULTIPLE DISPLAY REFRESH RATES

(71) Applicant: Google LLC, Mountain View, CA (US)

(72) Inventors: Chien-Hui Wen, Cupertino, CA (US); Hsin-Yu Chen, Taoyuan (TW)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 18/273,933

(22) PCT Filed: Jan. 25, 2021

(86) PCT No.: PCT/US2021/014902
§ 371 (c)(1),
(2) Date: Jul. 24, 2023

(87) PCT Pub. No.: WO2022/159114
PCT Pub. Date: Jul. 28, 2022

(65) Prior Publication Data
US 2024/0087494 A1 Mar. 14, 2024

(51) Int. Cl.
*G09G 3/20* (2006.01)

(52) U.S. Cl.
CPC ... *G09G 3/2007* (2013.01); *G09G 2320/0247* (2013.01); *G09G 2320/0276* (2013.01);
(Continued)

(58) Field of Classification Search
None
See application file for complete search history.

(56) References Cited

U.S. PATENT DOCUMENTS 6,064,382 A 5/2000 Diedrich et al.
6,862,022 B2 3/2005 Slupe
(Continued)

FOREIGN PATENT DOCUMENTS

CN 102812509 B 3/2016
CN 105895051 A 8/2016
(Continued)

OTHER PUBLICATIONS

Internationalsearching Authority, International Search Report and Written Opinion mailed Oct. 15, 2021, issued in connection with International Patent Application No. PCT/US2021/014902, filed Jan. 25, 2021, 22 pages.
(Continued)

*Primary Examiner* — Matthew Yeung
(74) *Attorney, Agent, or Firm* — McDonnell Boehnen Hulbert & Berghoff LLP

(57) ABSTRACT

A method for calibrating input display data for multiple display refresh rates comprises measuring (1210) an optical property of a display panel for an input gray level at a first refresh rate, measuring (1220) the optical property for a plurality of candidate gray levels at a second refresh rate, selecting (1230), based on the measured optical properties of the display panel, a corresponding gray level for the input gray level, wherein the corresponding gray level is selected from the plurality of candidate gray levels and storing (1240), at the device, the corresponding gray level for the input gray level, wherein subsequent to the storing, the device is configured to adjust input display data using the corresponding gray level for the input gray level when the display panel is transitioning from the first refresh rate to the second refresh rate.

21 Claims, 13 Drawing Sheets

(52) U.S. Cl.
CPC ............... *G09G 2320/0673* (2013.01); *G09G 2340/0435* (2013.01)

(56) References Cited

U.S. PATENT DOCUMENTS

| | | | | |
|---|---|---|---|---|
| 9,361,856 | B2 | 6/2016 | Jiang | |
| 9,501,993 | B2 | 11/2016 | Nambi et al. | |
| 9,620,064 | B2 | 4/2017 | Albrecht et al. | |
| 9,847,056 | B2 | 12/2017 | Shimizu et al. | |
| 11,189,222 | B1 | 11/2021 | Aogaki et al. | |
| 11,854,452 | B2 | 12/2023 | Wen et al. | |
| 2002/0051121 | A1 | 5/2002 | Kanai | |
| 2003/0001810 | A1 | 1/2003 | Yamaguchi et al. | |
| 2003/0016215 | A1 | 1/2003 | Slupe | |
| 2006/0146008 | A1 | 7/2006 | Johnson et al. | |
| 2008/0117142 | A1 | 5/2008 | Lin et al. | |
| 2009/0058763 | A1 | 3/2009 | Doi et al. | |
| 2012/0056911 | A1 | 3/2012 | Safaee-Rad et al. | |
| 2013/0147857 | A1 | 6/2013 | Kurikko | |
| 2014/0125618 | A1 | 5/2014 | Panther et al. | |
| 2014/0198093 | A1* | 7/2014 | Nambi | G09G 3/3611 345/212 |
| 2014/0267370 | A1 | 9/2014 | Albrecht et al. | |
| 2014/0267448 | A1 | 9/2014 | Albrecht et al. | |
| 2016/0042708 | A1 | 2/2016 | Wang et al. | |
| 2016/0093248 | A1 | 3/2016 | Shimizu et al. | |
| 2016/0173862 | A1 | 6/2016 | Huang et al. | |
| 2016/0307523 | A1 | 10/2016 | Huang et al. | |
| 2017/0206859 | A1 | 7/2017 | Jun et al. | |
| 2017/0243548 | A1 | 8/2017 | Wang et al. | |
| 2018/0090084 | A1 | 3/2018 | Zheng et al. | |
| 2018/0254010 | A1 | 9/2018 | Kitada et al. | |
| 2019/0035366 | A1 | 1/2019 | Li et al. | |
| 2019/0102597 | A1 | 4/2019 | Lu et al. | |
| 2019/0116304 | A1 | 4/2019 | Hasinoff et al. | |
| 2019/0180695 | A1* | 6/2019 | Ha | G09G 3/2051 |
| 2019/0278967 | A1 | 9/2019 | Shepelev et al. | |
| 2020/0082791 | A1 | 3/2020 | Petrie | |
| 2020/0160792 | A1 | 5/2020 | Park et al. | |
| 2020/0175246 | A1 | 6/2020 | Park | |
| 2020/0211442 | A1 | 7/2020 | Kim et al. | |
| 2020/0242321 | A1 | 7/2020 | Cao et al. | |
| 2020/0265769 | A1 | 8/2020 | Pyo et al. | |
| 2020/0286431 | A1 | 9/2020 | Sugiyama et al. | |
| 2020/0394945 | A1 | 12/2020 | Shin | |
| 2021/0012717 | A1 | 1/2021 | Park et al. | |
| 2021/0097943 | A1 | 4/2021 | Wyatt | |
| 2023/0274678 | A1* | 8/2023 | Wen | G09G 3/2003 345/214 |
| 2023/0335053 | A1* | 10/2023 | Jiang | G09G 3/3233 |
| 2024/0046860 | A1* | 2/2024 | Choi | G09G 3/20 |
| 2024/0135854 | A1* | 4/2024 | Wen | G09G 5/026 |
| 2024/0304132 | A1* | 9/2024 | Li | G09G 3/32 |

FOREIGN PATENT DOCUMENTS

| | | | |
|---|---|---|---|
| CN | 107591119 | | 1/2018 |
| CN | 105103214 | B | 6/2018 |
| CN | 106875925 | B | 4/2019 |
| CN | 107274833 | B | 7/2019 |
| CN | 110086961 | A | 8/2019 |
| CN | 110473500 | | 11/2019 |
| CN | 109686307 | A | 6/2020 |
| CN | 110276326 | B | 7/2021 |
| CN | 111916032 | B | 6/2023 |
| EP | 1220193 | B1 | 3/2004 |
| EP | 2469505 | B1 | 2/2019 |
| GB | 2562536 | A | 11/2018 |
| JP | 2003005736 | A | 1/2003 |
| JP | 2004355405 | A | 12/2004 |
| JP | 2005352412 | A | 12/2005 |
| JP | 2006030559 | A | 2/2006 |
| JP | 2006330292 | A | 12/2006 |
| JP | 2008287702 | A | 11/2008 |
| JP | 2010097097 | A | 4/2010 |
| JP | 2010130102 | A | 6/2010 |
| JP | 2014519045 | A | 8/2014 |
| JP | 2015049567 | A | 3/2015 |
| JP | 2015191039 | A | 11/2015 |
| JP | 2017049319 | A | 3/2017 |
| JP | 2019511856 | A | 4/2019 |
| JP | 2020144256 | A | 9/2020 |
| KR | 20110030212 | A | 3/2011 |
| KR | 20140108780 | A | 9/2014 |
| TW | 200947411 | A | 11/2009 |
| TW | 201246165 | A | 11/2012 |
| WO | 2014/188789 | A1 | 11/2014 |
| WO | 2018/211287 | A1 | 11/2018 |
| WO | 2019/183786 | A1 | 10/2019 |
| WO | 2021066837 | A1 | 4/2021 |
| WO | 2022/159114 | A1 | 7/2022 |

OTHER PUBLICATIONS

Choi, Sangmoo, "Clock Trace Structure for Block Sequential Clock Driving," Technical Disclosure Commons, Dec. 2021, 11 pages.

International Property India, First Examination Report mailed on Apr. 13, 2023, issued in connection with Indian Patent Application No. 20234700173, 5 pages.

International Searching Authority, International Search Report and Written Opinion mailed Jul. 29, 2022, issued in connection with International Patent Application No. PCT/US2021/073067, filed Dec. 22, 2021, 25 pages.

International Searching Authority, International Search Report and Written Opinion mailed on Jan. 7, 2022, issued in connection with International Patent Application No. PCT/US2021/026838, filed Apr. 12, 2021, 26 pages.

International Searching Authority, International Search Report and Written Opinion mailed on Sep. 8, 2021, issued in connection with International Patent Application No. PCT/US2021/033978, filed on May 25, 2021, 15 pages.

International Searching Authority, International Search Report and Written Opinion mailed on Sep. 14, 2021, issued in connection with International Patent Application No. PCT/US2020/060413, filed Nov. 13, 2020, 23 pages.

International Searching Authority, International Search Report and Written Opinion mailed on Dec. 17, 2019, issued in connection with International Patent Application No. PCT/US2019/054674 filed Oct. 4, 2019, 14 pages.

Korean Patent Office, Office Action mailed on Sep. 19, 2023, issued in connection with Korean Patent Application No. 1020227000850, 10 pages.

* cited by examiner

100

| Gamma Table (Brightness at each Tap Point) | | | | | | | | | | |
|---|---|---|---|---|---|---|---|---|---|---|
| | | TAP | | | | | | | | |
| DBV Band | Luminance | G255 | G216 | G160 | G91 | G54 | G37 | G24 | G12 | G7 |
| 7 | 500 nits | 500 | 347.04 | 179.327 | 51.817 | 16.438 | 7.155 | 2.761 | 0.601 | 0.184 |
| | | G255 | | G182 | G107 | G73 | G48 | G23 | G15 | G7 |
| 6 | 80 nits | 80 | | 38.094 | 11.84 | 5.105 | 2.03 | 0.402 | 0.157 | 0.029 |
| 5 | 50 nits | 50 | | 23.809 | 7.4 | 3.191 | 1.269 | 0.251 | 0.098 | 0.018 |
| 4 | 25 nits | 25 | | 11.904 | 3.7 | 1.595 | 0.634 | 0.126 | 0.049 | 0.009 |
| 3 | 10 nits | 10 | | 4.762 | 1.48 | 0.638 | 0.254 | 0.05 | 0.02 | 0.004 |
| 2 | 5 nits | 5 | | 2.381 | 0.74 | 0.319 | 0.127 | 0.025 | 0.01 | 0.002 |
| 1 | 2 nits | 2 | | 0.952 | 0.296 | 0.128 | 0.051 | 0.01 | 0.004 | 0.001 |

LEGENDS:

| | |
|---|---|
| (light shading) | Luminance > 0.055 nits |
| (dark shading) | Luminance < 0.055 nits |

Figure 1

500

| Gray Levels (505) | Luminance (510) 60Hz before calibration | Luminance (515) 90Hz before calibration | Delta L before calibration (%) (520) | 90Hz after calibration (530) | | Delta L after calibration (%) (535) |
|---|---|---|---|---|---|---|
| G14 | 0.126 | 0.131 | 4.42 | No need to change | | |
| G13 | 0.099 | 0.110 | 10.96 | 0.092 | G12 | -6.48 |
| G12 | 0.074 | 0.092 | 24.88 | 0.081 | G11 | 9.45 |
| G11 | 0.058 | 0.081 | 40.52 | 0.056 | G9 | -3.44 |
| G10 | 0.042 | 0.066 | 58.43 | 0.046 | G8 | 8.90 |
| G9 | 0.028 | 0.056 | 95.80 | 0.030 | G7 | 6.75 |
| G8 | 0.017 | 0.046 | 160.99 | 0.010 | G6 | -44.66 |
| G7 | 0.007 | 0.030 | 309.67 | 0.010 | G6 | 30.32 |

510

525

Figure 5

600

| C1<br>60HZ GRAY | C2<br>60HZ ORIGINAL | C3<br>90HZ BEFORE CAL | C4<br>90HZ AFTER CAL | C5<br>90HZ NEW GRAY | C6<br>DELTA L BEFORE CAL | C7<br>DELTA L AFTER CAL |
|---|---|---|---|---|---|---|
| 50 | 0.1423 | 0.1281 | 0.1422 | 52 | 9.93 | 0.01 |
| 49 | 0.1365 | 0.1229 | 0.1357 | 51 | 9.95 | 0.53 |
| **48** | **0.1302** | **0.1171** | **0.1281** | **50** | **10.04** | **1.61** |
| 47 | [illegible] | [illegible] | [illegible] | 49 | [illegible] | [illegible] |
| 46 | 0.1178 | 0.1060 | 0.1171 | 48 | 10.07 | 0.59 |
| 45 | 0.1111 | [illegible] | 0.1118 | 47 | 10.06 | 0.58 |
| 44 | 0.1056 | 0.0949 | [illegible] | 46 | 10.11 | 0.36 |
| 43 | 0.0994 | 0.0888 | 0.0999 | 45 | 10.65 | 0.55 |
| 42 | 0.0946 | 0.0842 | 0.0949 | 44 | 10.97 | 0.33 |
| 41 | 0.0892 | 0.0790 | 0.0888 | 43 | 11.35 | 0.39 |
| 40 | 0.0846 | 0.0754 | 0.0842 | 42 | 10.94 | 0.49 |
| 39 | 0.0795 | 0.0706 | 0.0790 | 41 | 11.22 | 0.58 |
| 38 | 0.0750 | 0.0666 | 0.0754 | 40 | 11.29 | 0.47 |
| 37 | 0.0709 | 0.0621 | 0.0706 | 39 | [illegible] | 0.39 |
| 36 | 0.0656 | 0.0579 | 0.0666 | 38 | 11.67 | 1.45 |
| 35 | 0.0618 | 0.0545 | 0.0621 | 37 | 11.77 | 0.47 |
| 34 | 0.0576 | 0.0503 | 0.0579 | 36 | 12.66 | 0.54 |
| **33** | **0.0543** | **0.0476** | **0.0545** | **35** | **12.34** | **0.39** |
| 32 | [illegible] | [illegible] | [illegible] | 34 | [illegible] | [illegible] |
| 31 | 0.0475 | 0.0414 | 0.0476 | 33 | 12.91 | 0.21 |
| 30 | 0.0447 | 0.0385 | 0.0445 | 32 | 13.96 | 0.57 |
| 29 | 0.0408 | 0.0353 | 0.0414 | 31 | 13.45 | 1.36 |
| 28 | 0.0378 | 0.0322 | 0.0385 | 30 | 14.85 | 1.89 |
| 27 | 0.0342 | 0.0292 | 0.0353 | 29 | 14.77 | 3.22 |
| 26 | 0.0315 | 0.0266 | 0.0322 | 28 | 15.61 | 2.11 |
| 25 | 0.0283 | 0.0239 | 0.0292 | 27 | 15.53 | 2.95 |
| 24 | 0.0258 | 0.0215 | 0.0266 | 26 | 16.57 | 3.20 |
| 23 | 0.0232 | 0.0194 | 0.0239 | 25 | 16.29 | 3.29 |
| 22 | 0.0209 | 0.0176 | 0.0215 | 24 | 16.02 | 2.62 |
| 21 | 0.0190 | 0.0160 | 0.0194 | 23 | 15.79 | [illegible] |
| 20 | [illegible] | 0.0151 | 0.0160 | 21 | 11.81 | 6.09 |
| 19 | 0.0153 | 0.0137 | 0.0151 | 20 | 10.51 | 1.49 |
| 18 | 0.0139 | 0.0128 | 0.0137 | 19 | 8.42 | 1.86 |
| 17 | 0.0122 | 0.0119 | 0.0119 | 17 | 2.65 | 2.65 |
| 16 | 0.0106 | 0.0104 | 0.0104 | 16 | 2.12 | [illegible] |
| 15 | [illegible] | 0.0091 | 0.0091 | 15 | 0.72 | 0.72 |
| 14 | 0.0073 | 0.0074 | [illegible] | 14 | [illegible] | 1.92 |
| 13 | 0.0056 | 0.0055 | 0.0055 | 13 | 1.33 | 1.33 |
| 12 | 0.0040 | 0.0042 | 0.0042 | 12 | 3.54 | 3.54 |
| 11 | 0.0028 | 0.0028 | 0.0028 | 11 | 1.01 | 1.01 |

605 610 615 620 625 630 635 640

Figure 6

CALIBRATING INPUT DISPLAY DATA FOR SEAMLESS TRANSITIONS IN MULTIPLE DISPLAY REFRESH RATES

This application is a national stage application under 35 U.S.C. § 371 of International Application No. PCT/US2021/014902, filed Jan. 25, 2021 which is hereby incorporated by reference in its entirety.

BACKGROUND

A refresh rate may refer to the number of times per second at which an image refreshes on a display panel of a device. For example, a refresh rate of 60 Hertz (Hz) means that an image is refreshed 60 times per second. Higher refresh rates typically lead to better user experiences, but also result in higher power usage for the device.

Sometimes, a display panel can operate at multiple refresh rates. For example, when executing a video streaming application, a device may set the refresh rate of a display panel to 90 Hz, whereas when executing a word processing application, the device may set the refresh rate of the display panel to 60 Hz.

SUMMARY

The present disclosure generally relates to a display panel of a device. The display panel may be configured to operate at a first refresh rate or a second refresh rate. Depending on measured optical properties of the display panel at the first refresh rate and the second refresh rate, the device may be configured to adjust input display data when the display panel is transitioning from the first refresh rate to the second refresh rate.

In a first aspect, a computer-implemented method is provided. The method may include measuring, from a device having a display panel configured to operate at multiple refresh rates, an optical property of the display panel for an input gray level at a first refresh rate. The method may further include measuring, from the device, the optical property of the display panel for a plurality of candidate gray levels at a second refresh rate. The method may also include selecting, based on the measured optical property of the display panel for the input gray level and the plurality of candidate gray levels, a corresponding gray level for the input gray level, wherein the corresponding gray level is selected from the plurality of candidate gray levels. The method may further include storing, at the device, the corresponding gray level for the input gray level, wherein subsequent to the storing, the device is configured to adjust input display data using the corresponding gray level for the input gray level when the display panel is transitioning from the first refresh rate to the second refresh rate.

In a second aspect, a system is provided. The system may include one or more processors. The system may also include data storage, where the data storage has stored thereon computer-executable instructions that, when executed by the one or more processors, cause the system to carry out operations. The operations may include measuring, from a device having a display panel configured to operate at multiple refresh rates, an optical property of the display panel for an input gray level at a first refresh rate. The operations may further include measuring, from the device, the optical property of the display panel for a plurality of candidate gray levels at a second refresh rate. The operations may also include selecting, based on the measured optical property of the display panel for the input gray level and the plurality of candidate gray levels, a corresponding gray level for the input gray level, wherein the corresponding gray level is selected from the plurality of candidate gray levels. The operations may further include storing, at the device, the corresponding gray level for the input gray level, wherein subsequent to the storing, the device is configured to adjust input display data using the corresponding gray level for the input gray level when the display panel is transitioning from the first refresh rate to the second refresh rate.

In a third aspect, a device is provided. The device includes one or more processors operable to perform operations. The operations may include measuring, from a device having a display panel configured to operate at multiple refresh rates, an optical property of the display panel for an input gray level at a first refresh rate. The operations may further include measuring, from the device, the optical property of the display panel for a plurality of candidate gray levels at a second refresh rate. The operations may also include selecting, based on the measured optical property of the display panel for the input gray level and the plurality of candidate gray levels, a corresponding gray level for the input gray level, wherein the corresponding gray level is selected from the plurality of candidate gray levels. The operations may further include storing, at the device, the corresponding gray level for the input gray level, wherein subsequent to the storing, the device is configured to adjust input display data using the corresponding gray level for the input gray level when the display panel is transitioning from the first refresh rate to the second refresh rate.

In a fourth aspect, an article of manufacture is provided. The article of manufacture may include a non-transitory computer-readable medium having stored thereon program instructions that, upon execution by one or more processors of a computing device, cause the computing device to carry out operations. The operations may include measuring, from a device having a display panel configured to operate at multiple refresh rates, an optical property of the display panel for an input gray level at a first refresh rate. The operations may further include measuring, from the device, the optical property of the display panel for a plurality of candidate gray levels at a second refresh rate. The operations may also include selecting, based on the measured optical property of the display panel for the input gray level and the plurality of candidate gray levels, a corresponding gray level for the input gray level, wherein the corresponding gray level is selected from the plurality of candidate gray levels. The operations may further include storing, at the device, the corresponding gray level for the input gray level, wherein subsequent to the storing, the device is configured to adjust input display data using the corresponding gray level for the input gray level when the display panel is transitioning from the first refresh rate to the second refresh rate.

In a fifth aspect, a computer-implemented method is provided. The method may include identifying an input gray level while a display panel of a device is operating at a first refresh rate. The method may further include retrieving, from a storage at the device, a corresponding gray level for the input gray level, wherein the corresponding gray level has been selected from a plurality of candidate gray levels based on a measured optical property of the display panel of the device for the input gray level and the plurality of candidate gray levels at the first refresh rate and at a second refresh rate. The method may also include adjusting input display data using the corresponding gray level for the input gray level. The method may further include transitioning, based on the adjusted input display data, the display panel from the first refresh rate to the second refresh rate.

In a sixth aspect, a system is provided. The system may include one or more processors. The system may also include data storage, where the data storage has stored thereon computer-executable instructions that, when executed by the one or more processors, cause the system to carry out operations. The operations may include identifying an input gray level while a display panel of a device is operating at a first refresh rate. The operations may further include retrieving, from a storage at the device, a corresponding gray level for the input gray level, wherein the corresponding gray level has been selected from a plurality of candidate gray levels based on a measured optical property of the display panel of the device for the input gray level and the plurality of candidate gray levels at the first refresh rate and at a second refresh rate. The operations may also include adjusting input display data using the corresponding gray level for the input gray level. The operations may further include transitioning, based on the adjusted input display data, the display panel from the first refresh rate to the second refresh rate.

In a seventh aspect, a device is provided. The device includes one or more processors operable to perform operations. The operations may include identifying an input gray level while a display panel of a device is operating at a first refresh rate. The operations may further include retrieving, from a storage at the device, a corresponding gray level for the input gray level, wherein the corresponding gray level has been selected from a plurality of candidate gray levels based on a measured optical property of the display panel of the device for the input gray level and the plurality of candidate gray levels at the first refresh rate and at a second refresh rate. The operations may also include adjusting input display data using the corresponding gray level for the input gray level. The operations may further include transitioning, based on the adjusted input display data, the display panel from the first refresh rate to the second refresh rate.

In an eighth aspect, an article of manufacture is provided. The article of manufacture may include a non-transitory computer-readable medium having stored thereon program instructions that, upon execution by one or more processors of a computing device, cause the computing device to carry out operations. The operations may include identifying an input gray level while a display panel of a device is operating at a first refresh rate. The operations may further include retrieving, from a storage at the device, a corresponding gray level for the input gray level, wherein the corresponding gray level has been selected from a plurality of candidate gray levels based on a measured optical property of the display panel of the device for the input gray level and the plurality of candidate gray levels at the first refresh rate and at a second refresh rate. The operations may also include adjusting input display data using the corresponding gray level for the input gray level. The operations may further include transitioning, based on the adjusted input display data, the display panel from the first refresh rate to the second refresh rate.

Other aspects, embodiments, and implementations will become apparent to those of ordinary skill in the art by reading the following detailed description, with reference where appropriate to the accompanying drawings.

BRIEF DESCRIPTION OF THE FIGURES

FIG. 1 is a table illustrating brightness values for various gray levels, in accordance with example embodiments.

FIG. 5 is a table illustrating delta luminance values before and after calibration, in accordance with example embodiments.

FIG. 6 illustrates a lookup table, in accordance with example embodiments.

DETAILED DESCRIPTION

Figure 2:
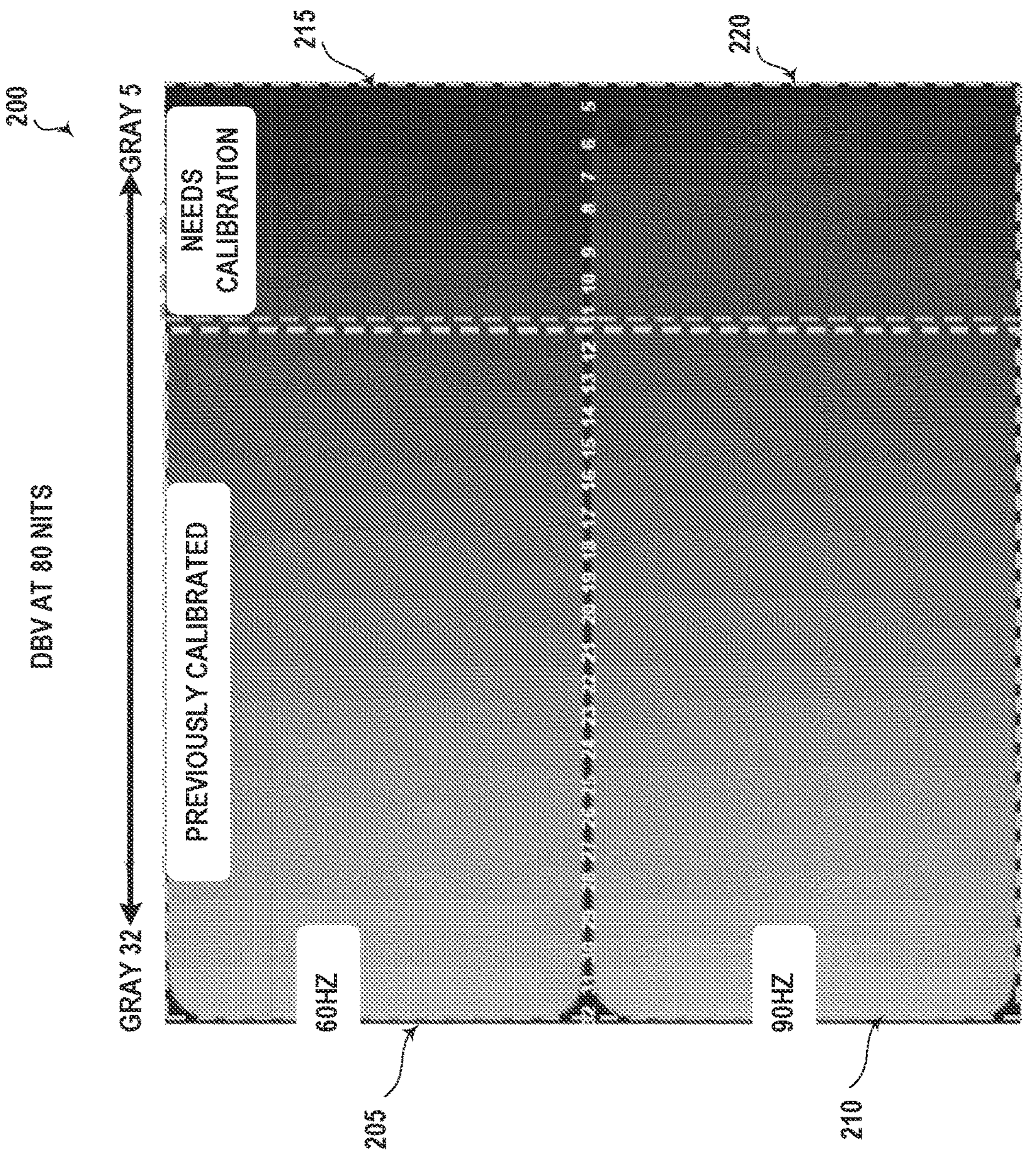
FIG. 2 depicts luminance values for various gray levels at 60 Hz and 90 Hz, in accordance with example embodiments.

Example methods, devices, articles of manufacture, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features. Other embodiments can be utilized, and other changes can be made, without departing from the scope of the subject matter presented herein.

Thus, the example embodiments described herein are not meant to be limiting. Aspects of the present disclosure, as generally described herein, and illustrated in the figures, can be arranged, substituted, combined, separated, and designed in a wide variety of different configurations, all of which are contemplated herein.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

I. Overview

High display refresh rates (e.g., 90 Hz or 120 Hz) for a display panel of a computing device may be desirable when executing visually complex software applications, such as video or gaming applications. However, higher refresh rates also cause the computing device to consume more power. To strike a balance between performance and battery life, some display panels can operate at one of multiple different refresh rates (e.g., 10 Hz, 30 Hz, 60 Hz, 90 Hz, and 120 Hz). That is, depending on the application being executed, the display panel can switch between multiple refresh rates.

However, optical characteristics may differ between different refresh rates. Specifically, the luminance and color of a display panel may differ between 60 Hz and 90 Hz. When the display panel switches from 60 Hz to 90 Hz (and vice versa), this optical difference may manifest itself as a visual flicker on the display panel. Consequently, if the display panel frequently switches between 60 Hz and 90 Hz refresh rates, the visual flicker may become highly pronounced and detrimental to a user's experience. Further, because human eyes are highly sensitive to changes at low luminance settings, the visual flicker is especially noticeable when the luminance of the display panel is low and/or when the ambient light of the environment surrounding the display panel is low.

Some solutions attempt to solve this "flicker problem" by disabling transitions between 60 Hz and 90 Hz when the luminance of the display panel is low. But an issue with these solutions is that the definition of what is considered "low display luminance" can be fairly high. In some example computing devices, the ideal transition threshold to alleviate all flickering has been found to be 75%. In other words, if the luminance of the display panel is at or above 75% of the total possible luminance of the display panel, then transitions between 60 Hz and 90 Hz may be permitted. And if the luminance of the display panel is below 75% of the total possible luminance, then transitions between 60 Hz and 90 Hz may not be permitted. But because users often keep the luminance of the display panel below 75%, minimum benefits of using multiple refresh rates are obtained.

One way to achieve a smooth transition of a display panel from a first refresh rate to a second refresh rate is to minimize a difference in an optical property of the display panel during the transition at all gray levels and brightness settings. The term, "optical property" as used herein may refer to any measurable property of an image displayed by a device. For example, the optical property may refer to a color or luminance value of a display panel when an image is displayed by the device, or when a device transitions between different refresh rates. Also, for example, an optical property may refer to properties such as, for example, levels of refraction, absorption, scattering, reflection, and so forth.

Generally, values for an optical property (e.g., color and luminance) can be calibrated at factory and stored in a display drive integrated circuit (DDIC). In practice, this is performed for high brightness and high gray levels. However, such calibration for low brightness and low gray levels may require additional time ("takt time"). Generally, takt time refers to an amount of time a manufacturer has per unit to produce enough goods to fulfil customer demand. Accordingly, manufacturers may be less inclined to perform such calibrations given the higher takt time. Therefore, optical distortions may appear for transitions at low brightness and low gray levels. In some implementations, a blocking zone may be applied to disable transitions of a display panel between refresh rates when the display is at low brightness and low gray levels. However, it is desirable to remove blocking zones and enable transitions for all brightness and gray levels.

Some techniques described herein address these issues by adjusting input display data using a corresponding gray level for an input gray level when the display panel of a device is transitioning from the first refresh rate to the second refresh rate. After applying these adjustments, the optical property of the display panel (e.g., color, luminance, etc.) when operating at 60 Hz may become similar to the optical property of the display panel when operating at 90 Hz, and thus the visual flicker that occurs when switching between 60 Hz and 90 Hz may become less pronounced. To facilitate this, an optical property of the display panel for an input gray level at a first refresh rate may be measured for the display panel. Also, the optical property of the display panel may be measured for a plurality of candidate gray levels at a second refresh rate. Then, based on the measured optical property of the display panel for the input gray level and the plurality of candidate gray levels, a corresponding gray level for the input gray level may be selected. The corresponding gray level may be selected from the plurality of candidate gray levels. The corresponding gray level may be stored at the device. Subsequently, the device can be configured to adjust input display data using the corresponding gray level for the input gray level when the display panel is transitioning from the first refresh rate to the second refresh rate.

By using the herein-described techniques, multiple refresh rates can be utilized while reducing or eliminating any flickering effect. Other advantages are also contemplated and will be appreciated from the discussion herein.

II. Example Techniques for Determining Adjusted Input Display Data

FIG. 1 is a table 100 illustrating brightness values for various gray levels, in accordance with example embodiments. Table 100 illustrates seven display brightness value (DBV) bands, DBV band 1 to DBV band 7. The DBVs control brightness settings of a display panel. Each DBV band corresponds to a brightness level setting. For example, band 7 controls brightness settings from a luminance of 81 nits to a luminance of 500 nits, band 6 controls brightness settings from a luminance of 51 nits to a luminance of 80 nits, band 5 controls brightness settings from a luminance of 26 nits to a luminance of 50 nits, and so forth. Generally, each image pixel of a digital image may have a numerical value that represents the luminance (e.g., brightness or darkness) of the digital image at a particular spot in a display. These numerical values may be referred to as "gray levels." The number of gray levels may depend on the number of bits used to represent the numerical values. For example, if 8 bits were used to represent a numerical value, a display panel may provide 256 gray levels, with a numerical value of 0 corresponding to full black and a numerical value of 255 corresponding to full white. As a more specific example, a controller may provide to the display component a digital image stream containing 24 bits, with 8 bits corresponding to a gray level for each of the red, green, and blue color channels of a pixel group.

To enable accurate control of brightness levels, each DBV band may also have a plurality of gray levels that are designated as gamma control points ("tap points"). For example, as illustrated in table 100, each DBV band has register tap points at gray level G7, gray level G12, gray level G24, gray level G37, and so forth. The tap points may range from gray level G255 to G7. For each tap point, a device may be configured with a control or a knob to control the pixel values of red, green, and blue (RGB). The RGB ratio can be balanced between 60 and 90 Hz. Each DBV band and gray level corresponds to a brightness value.

For example, at DBV band 7 and gray level G7, the brightness value is 0.184 nits, at DBV band 6 and gray level G7, the brightness value reduces to 0.029 nits. At DBV band 1 and gray level G7, the brightness value reduces to 0.001 nits.

The cells in table 100 are of three types based on the brightness settings: a first type of cells are those that are at a high level of brightness, and are indicated without any shading. The brightness settings in these cells can be accurately configured (e.g., by a device manufacturer). For example, at DBV band 7, with a luminance of 500 nits, brightness levels at all tap points can be accurately configured for the device, except at a tap point of G7. Similarly, at DBV band 6, with a luminance of 80 nits, brightness levels at all tap points can be accurately configured for the device, except at tap points G7 and G15.

A second type of cells are those that are at an intermediate level of brightness. These cells are generally those with a luminance value greater than 0.055 nits, and are shaded with vertical lines. For example, at DBV band 6, tap point G15 corresponds to an intermediate brightness setting. As another example, at DBV band 5, tap points G15 and G23 correspond to an intermediate brightness setting. For these DBV bands and tap points, the brightness levels may not be accurately configured by a manufacturer, and adjustments to respective gamma values at 90 Hz are needed to reduce optical defects (this is described in more detail below). The adjusted gamma values can then be stored in the device (e.g., as a lookup table), and used at run time to modify luminance settings as the device transitions from a first refresh rate (e.g., 60 Hz) to a second refresh rate (e.g., 90 Hz).

A third type of cells are those that are at a low level of brightness. These cells are generally those with a luminance value less than 0.055 nits, and are shaded with horizontal lines. For example, at DBV bands 5 and 6, tap point G7 corresponds to a low brightness setting. As another example, at DBV band 4, tap points G15 and G7 correspond to a low brightness setting. For these DBV bands and tap points, the brightness levels may not be accurately configured by a manufacturer, and gamma adjustments can also not be made because of high takt time. Generally, these low brightness settings are blocked during transitions from a first refresh rate (e.g., 60 Hz) to a second refresh rate (e.g., 90 Hz). However, as described below, a device can be configured to transition smoothly at these settings by determining respective luminance values at input gray levels at different refresh rates (e.g., 60 Hz and 90 Hz), and then selecting, for each input gray level at 60 Hz, a corresponding gray level at 90 Hz, so that the respective optical property (e.g., luminance values) are similar. These techniques can also be applied to the second type of cells. This reduces optical defects for all brightness settings, and there is no need to block brightness settings.

For higher DBV bands and larger brightness values, devices can be accurately configured with brightness settings, and transitions may occur smoothly. As illustrated in table 100, brightness values are very small for low DBV bands and low gray levels. Equipment in factories are generally not able to accurately measure such brightness levels, such as, for example, when the brightness values are less than 0.055 nits. Therefore, transitions between refresh rates may be blocked for such low brightness values and low DBV bands in an effort to reduce optical defects such as flickering.

FIG. 2 depicts luminance values for various gray levels at 60 Hz and 90 Hz, in accordance with example embodiments. For example, an image capturing device, such as a colorimeter, can be used to capture images at various gray levels for a fixed DBV band, and different refresh rates. As illustrated in image 200, images can be captured at a DBV band of 80 nits (corresponding to band 6), for gray levels from gray 5 to gray 32, and for refresh rates at 60 Hz and 90 Hz. In some embodiments, for a device having a display panel configured to operate at multiple refresh rates, an optical property of the display panel can be measured for an input gray level at a first refresh rate.

For example, an image can be displayed on a device for a fixed DBV band and gray level at a first refresh rate (e.g., 60 Hz), and a colorimeter can capture the image and measure the luminance values. Then, the optical property of the display panel can be measured for the image at a second refresh rate (90 Hz). For example, while the image is displayed at 60 Hz, the refresh rate for the device can be switched to 90 Hz, and the colorimeter can capture a second image and measure the luminance value at 90 Hz. From the cross-section of each image, the respective brightness levels at each gray level can be determined. In some instances, depending on how the colorimeter is calibrated, the measurement of the brightness level may not be an absolute value of the brightness level, but may be a relative value between the two refresh rates. In some embodiments, one or more optical properties can be measured at each refresh rate, and these measured values can be used individually, or in combination, to determine a corresponding gray level for an input gray level. For example, the corresponding gray level can be determined based on luminance values, color, and/or a combination of the two. Additional and/or alternative optical properties can be used. Also, for example, different measurements can be determined for various optical viewing distances and/or viewing angles, and such measurements can be appropriately normalized and/or averaged. For purposes of clarity, the examples below will refer to a specific optical property such as luminance.

As illustrated in image 200, region 205 displays luminance values from gray levels 13 to 32 at 60 Hz, while region 210 displays luminance values from gray levels 13 to 32 at 90 Hz. As illustrated, the visible differences in luminance are negligible.

Region 215 displays luminance values from gray levels 5 to 13 at 60 Hz, while region 220 displays luminance values from gray levels 5 to 13 at 90 Hz. As illustrated, the visible differences in luminance are apparent. These differences may be further analyzed graphically.

Figure 3:
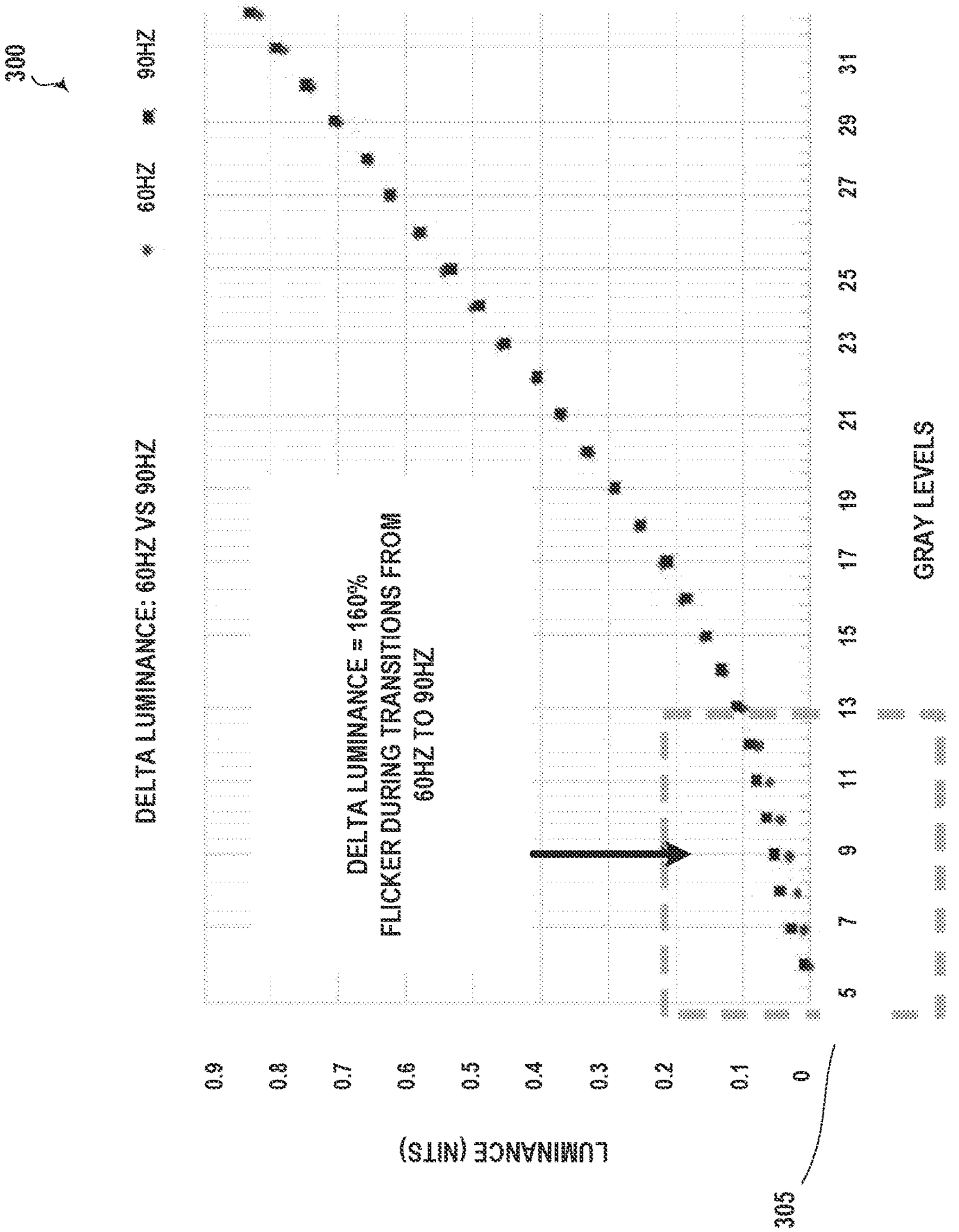
FIG. 3 is a graph illustrating relationships between luminance values and gray levels, in accordance with example embodiments.

FIG. 3 is a graph illustrating relationships between luminance values and gray levels as depicted in FIG. 2, in accordance with example embodiments. Graph 300 is a graphical representation of the luminance values displayed in FIG. 2 for DBV band 6. The vertical axis corresponds to luminance values measured in nits, and the horizontal axis corresponds to gray levels from 5 to 32. Luminance values measured in image 200 of FIG. 2 are displayed for each gray level, and at the refresh rates at 60 Hz (corresponding points are represented by circles), and 90 Hz (corresponding points are represented by squares). As observed with respect to FIG. 2, for gray levels 13 to 32 (corresponding to regions 205 and 210 of FIG. 2), the luminance values at the two refresh rates are nearly identical (for example, the circles and squares are nearly overlapping). However, for gray levels 5 to 13 (corresponding to regions 215 and 220 of FIG. 2, and shown by a bounding box 305), the luminance values at the two refresh rates are different (for example, the circles and squares are at distinct points).

One way to quantitatively measure a difference in luminance values is to determine a delta luminance value. For example, delta luminance may be calculated as follows.

$$\text{Delta Luminance} = \Delta L = \frac{\text{Luminance at 90 Hz} - \text{Luminance at 60 Hz}}{\text{Luminance at 60 Hz}} \qquad \text{(Eqn. 1)}$$

or as:

$$\text{Delta Luminance} = \Delta L = \frac{\text{Luminance at 90 Hz} - \text{Luminance at 60 Hz}}{\text{Luminance at 90 Hz}} \quad \text{(Eqn. 2)}$$

As illustrated in FIG. 3, bounding box 305 corresponds to Delta luminance values of nearly 160%, indicating a large difference in luminance values as a display panel transitions from 60 Hz to 90 Hz. Such a large delta luminance results in optical defects such as flickering. Generally, delta luminance percentages that are less than a low threshold value are desirable to minimize flickering.

Figure 4:
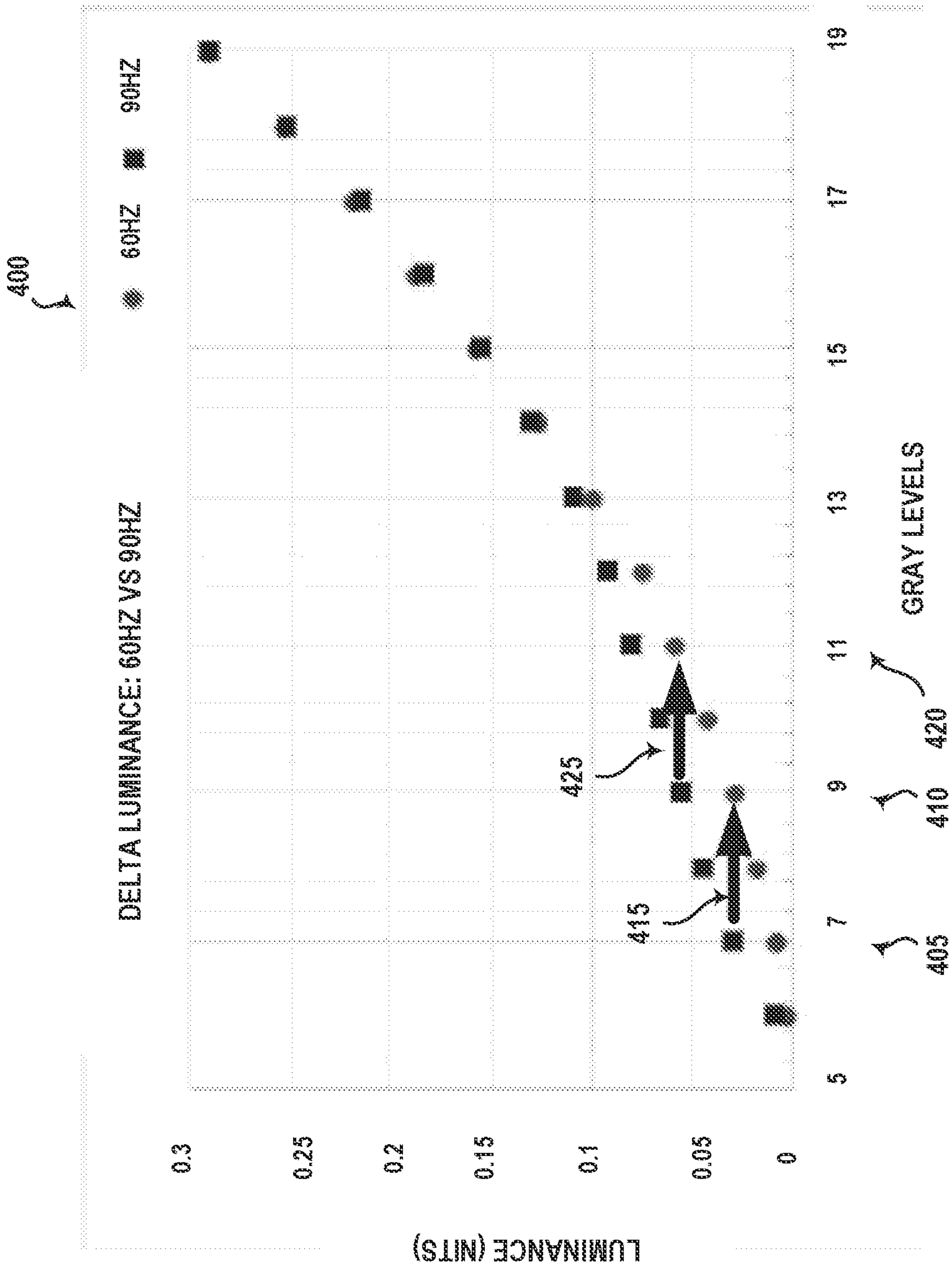
FIG. 4 is a graph illustrating adjustment of input data, in accordance with example embodiments.

FIG. 4 is a graph illustrating adjustment of input data, in accordance with example embodiments. Graph 400 displays luminance values along the vertical axis and gray levels along the horizontal axis. Luminance values at various gray levels at 60 Hz are represented by circles, and luminance values at gray levels at 90 Hz are represented by squares. To minimize optical defects, the delta luminance can be reduced. One way to achieve this is to adjust the gray level of the display so as to output similar luminance values at different refresh rates.

As illustrated in graph 400, at gray level G9 410, the measured luminance value at 60 Hz is 0.028 and the measured luminance value at 90 Hz is 0.056. However, the measured luminance at gray level G7 405 at 90 Hz is 0.030. Therefore, at gray level 9 410, in transitioning from 60 Hz to 90 Hz, the gray level at 90 Hz can be adjusted (as shown by arrow 415) to be at gray level 7 405, with a luminance value of 0.030, which is close to the luminance value 0.028 for gray level 9 410 at 60 Hz. Accordingly, in transitioning the display panel of the device from 60 Hz to 90 Hz, the luminance value changes from 0.028 nits to 0.030 nits, resulting in little to no flickering. However, if during transition, the luminance values had been changed from 0.028 to 0.056, the delta luminance would be very high, and there would likely be perceptible levels of flickering.

As another example, at gray level G11 420, the measured luminance value at 60 Hz is 0.058 and the measured luminance value at 90 Hz is 0.081. However, the measured luminance at gray level G9 410 at 90 Hz is 0.056. Therefore, at gray level 11 420, in transitioning from 60 Hz to 90 Hz, the gray level at 90 Hz can be adjusted (as shown by arrow 425) to be at gray level 9 410, with a luminance value of 0.056, which is close to the luminance value 0.058 for gray level 11 420 at 60 Hz. Accordingly, in transitioning the display panel of the device from 60 Hz to 90 Hz, the luminance value changes from 0.058 nits to 0.056 nits, resulting in little to no flickering. However, if during transition, the luminance values had been changed from 0.058 to 0.081, the delta luminance would be very high, and there would likely be perceptible levels of flickering.

FIG. 5 is a table illustrating delta luminance values before and after calibration, in accordance with example embodiments. Table 500 displays, for gray levels G7 to G14 as shown in column 505, luminance values at 60 Hz (shown in column 510) and luminance values at 90 Hz (shown in column 515). Corresponding delta luminance values are displayed as percentages in column 520. Column 530 shows the brightness values for adjusted gray levels at 90 Hz. Column 535 displays the delta luminance values after the adjustment or calibration is performed.

In some embodiments, the DBV band and/or the input gray level may be identified as ones that need to be adjusted and/or calibrated. For example, at a gray level G14, the luminance at 60 Hz is 0.126 and the luminance at 90 Hz is 0.131. Therefore, the corresponding delta luminance can be determined to be 4.42%, which is below a threshold percentage for delta luminance (e.g., 7%). Accordingly, a determination can be made that the gray level for G14 at 90 Hz does not need to be calibrated.

Row 525 displays values for gray level G9. As indicated in columns 510, 515, and 520 respectively, the luminance at 60 Hz is 0.028, the luminance at 90 Hz is 0.056, resulting in a delta luminance of 95.80%. Such a high delta luminance will likely cause perceptible optical defects. Accordingly, a determination can be made that the gray level for G9 at 90 Hz needs to be calibrated.

Calibration can be performed as illustrated with respect to FIG. 4. Referring to FIG. 5, the optical property (e.g., luminance values or color) of the display panel for a plurality of candidate gray levels at a second refresh rate (e.g., 90 Hz), are displayed in column 515. Therefore, a corresponding gray level for the input gray level (e.g., G9) can be selected, where the corresponding gray level is selected from the plurality of candidate gray levels. For example, for gray level G9, of all the luminance values in column 515, the one closest to the luminance value of 0.028 at 60 Hz is the luminance value 510 of 0.030 for gray level G7 at 90 Hz. Therefore, the corresponding gray level for the input gray level of G9 can be selected as gray level G7. Accordingly, as indicated in row 525, the entries in column 530 are "0.030" and "G7", and the device can be calibrated so that when the display panel is transitioned from 60 Hz to 90 Hz at input gray level G9, it adjusts input display data using the corresponding gray level G7. After such an adjustment, the delta luminance is 6.75%, as shown by the entry in row 525 and column 535. The term "input display data" as used herein, generally refers to values that are used for a display. For example, when the optical value is luminance, the input display data can be the luminance values (or brightness settings) at various gray levels. As another example, when the optical property is color, the input display data can be the respective values assigned to each pixel for red, blue and green colors. Each optical property can be associated with an input display data, and such data can be adjusted and/or calibrated.

FIG. 6 illustrates a lookup table, in accordance with example embodiments. Lookup table 600 can be determined by the process described with reference to FIG. 5. Lookup table 600 includes 7 columns, referred to herein as C1, C2, . . . , C7. Column C1 displays a plurality of input gray levels at 60 Hz. The gray levels displayed range from 11 to 50. Column C2 displays the luminance value at 60 Hz for each input gray level, and column C3 displays luminance values for a plurality of candidate gray levels at 90 Hz for each input gray level. The luminance values displayed in column C2 and C3 can be determined by measurements using a colorimeter, as described herein. Although luminance values are used to provide specificity to this description, values for another optical property can also be used. Column C4 displays luminance values at 90 Hz after a calibration is performed, and column C5 displays the corresponding gray levels at 90 Hz for each input gray level at 60 Hz. Columns C6 and C7 display respective delta luminance values before and after calibration is performed.

For each input gray value in block 605, block 610 displays how the gray level values at 60 Hz in block 605 are adjusted to obtain corresponding gray levels at 90 Hz. Similarly, for each input gray value in block 615, block 620 displays how the gray level values at 60 Hz in block 615 are adjusted to obtain corresponding gray levels at 90 Hz, and for each input gray value in block 625, block 630 displays how the gray level values at 60 Hz in block 625 are adjusted to obtain corresponding gray levels at 90 Hz. It may be noted that such an adjustment depends on the optical property of a display panel of a device.

As described with reference to FIG. 5, for an input gray level, and based on the measured optical property of the display panel for the input gray level and the plurality of candidate gray levels, a corresponding gray level for the input gray level can be selected. The corresponding gray level is selected from the plurality of candidate gray levels. For example, considering block 605 as an example, for input gray level 48 in column C1 and row 635, the corresponding luminance value at 60 Hz is 0.1302 (displayed in column C2) and the luminance value at 90 Hz is 0.1171 (displayed in column C3). The delta luminance value before calibration is 10.04% (as displayed in column C6). Accordingly, gray level 48 can be identified as an input gray level for which the luminance value at 90 Hz has to be adjusted. In an example implementation, the luminance value at 90 Hz is selected from among the luminance values for a plurality of candidate gray levels (displayed in column C3), and is selected to be a luminance value that is closest to the luminance value of 0.1302 for the input gray level 48 at 60 Hz. Accordingly, a luminance value of 0.1281 is selected (displayed in column C4), thereby selecting 50 as the corresponding gray level (displayed in column C5). A comparison of the delta luminance values in columns C6 and C7 indicates a drop in the delta luminance from 10.04% before calibration, to 1.61% after calibration. This leads to a desired reduction of optical defects when the input display data is adjusted using the corresponding gray level while transitioning the display panel from 60 Hz to 90 Hz.

As another example, continuing to consider block 605 as an example, for input gray level 33 in column C1 and row 640, the corresponding luminance value at 60 Hz is 0.0543 (displayed in column C2) and the luminance value at 90 Hz is 0.0476 (displayed in column C3). The delta luminance value before calibration is 12.34% (as displayed in column C6). Accordingly, gray level 33 can be identified as another input gray level for which the luminance value at 90 Hz has to be adjusted. In an example implementation, the luminance value at 90 Hz is selected from among the luminance values for the plurality of candidate gray levels (displayed in column C3), and is selected to be a luminance value that is closest to the luminance value of 0.0543 for the input gray level 33 at 60 Hz. Accordingly, a luminance value of 0.0545 is selected (displayed in column C4), thereby selecting 35 as the corresponding gray level (displayed in column C5). A comparison of the delta luminance values in columns C6 and C7 indicates a drop in the delta luminance from 12.34% before calibration, to 0.39% after calibration. This leads to a desired reduction of optical defects when the input display data is adjusted using the corresponding gray level while transitioning the display panel from 60 Hz to 90 Hz.

Considering input gray levels in block 615, input gray level of 21 with a luminance value of 0.0190 at 60 Hz is mapped to a corresponding gray level of 23 at 90 Hz with a luminance value of 0.0194, thereby decreasing the corresponding delta luminance from 15.79/o to 1.86%. As another example, input gray level of 20 with a luminance value of 0.0171 at 60 Hz is mapped to a corresponding gray level of 21 at 90 Hz with a luminance value of 0.0160, thereby decreasing the corresponding delta luminance from 11.81% to 6.09%. Also, for example, input gray level of 19 with a luminance value of 0.0153 at 60 Hz is mapped to a corresponding gray level of 20 at 90 Hz with a luminance value of 0.0151, thereby decreasing the corresponding delta luminance from 10.51% to 1.49%.

Considering input gray levels in block 625, input gray level of 17 with a luminance value of 0.0122 at 60 Hz is mapped to a corresponding gray level of 17 at 90 Hz with a luminance value of 0.0119, thereby leaving the corresponding delta luminance unchanged at 2.65%. For each input gray level at 60 Hz in block 625, the corresponding gray level at 90 Hz remains unchanged, as shown in block 630.

In some embodiments, at least one difference in the optical property of the display panel (e.g., delta luminance) between the first refresh rate and the second refresh rate for a second input gray level can be measured from the device. It can be determined that the at least one difference exceeds an optical threshold. In such instances, selection of a corresponding gray level for the second input gray level can be triggered. For example, a determination to adjust the input display data for an input gray level may be made by determining if a delta luminance before calibration (as displayed in column C6) exceeds a predefined threshold (e.g., 6%). For example, for input gray levels in the range from 18 to 50, the delta luminance before calibration exceeds 6% and a determination to adjust the input display data is made for these gray levels. However, for input gray levels in the range 11 to 17, the delta luminance before calibration does not exceed 6% and a determination not to adjust the input display data can be made for these gray levels.

Figure 7:
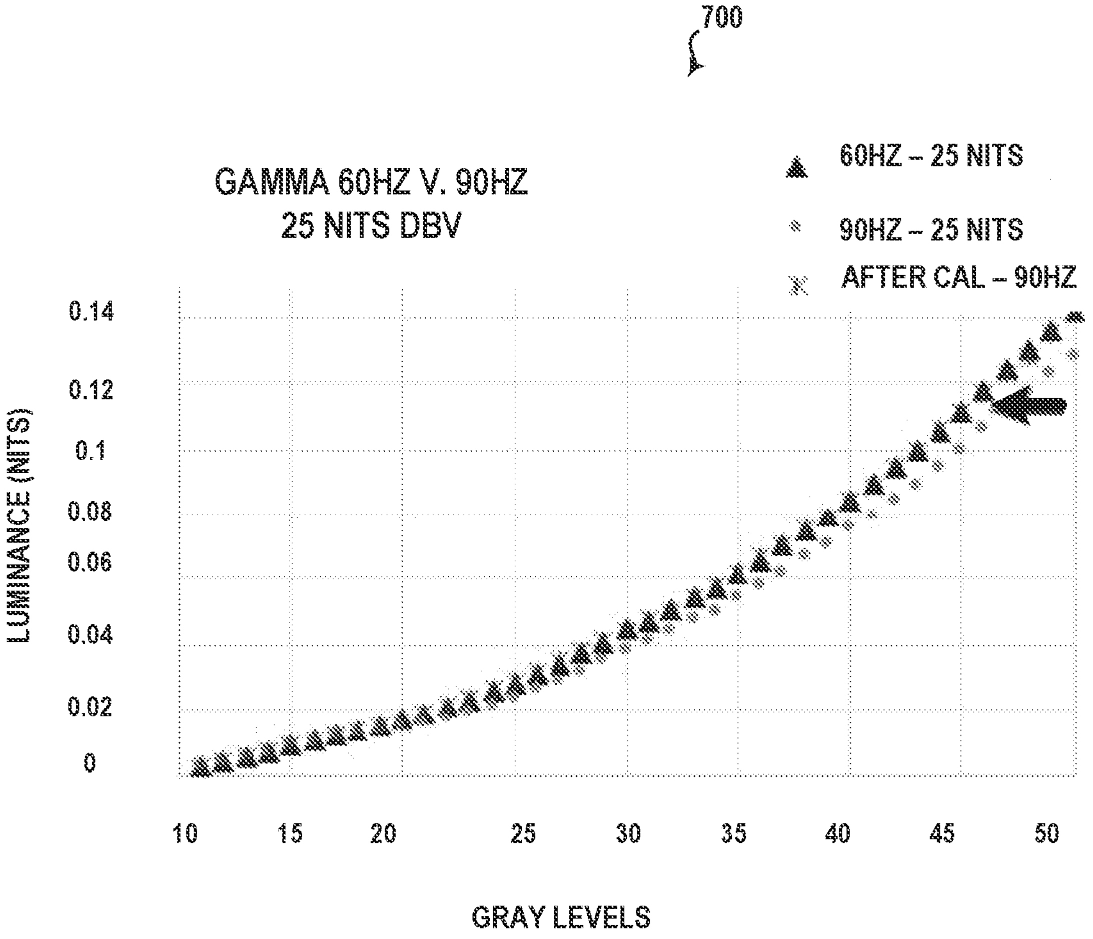
FIG. 7 is another graph illustrating adjustment of input data, in accordance with example embodiments.

FIG. 7 is another graph illustrating adjustment of input data, in accordance with example embodiments. Graph 700 is a graphical representation of luminance values for a DBV band of 25 nits at 60 Hz and 90 Hz, before and after calibration. For example, these values may correspond to luminance values displayed in lookup table 600 of FIG. 6. The horizontal axis corresponds to input gray levels ranging from 11 to 50 (as displayed in column C1 of lookup table 600 of FIG. 6), and the vertical axis corresponds to luminance values in nits. The luminance values at 60 Hz are represented by triangles (corresponding to values in column C2 of lookup table 600 of FIG. 6), luminance values at 90 Hz before calibration are represented by circles (corresponding to values in column C3 of lookup table 600 of FIG. 6), and luminance values at 90 Hz after calibration are represented by crosses (corresponding to values in column C4 of lookup table 600 of FIG. 6). For input gray levels 11 to 17 (corresponding to gray levels in block 625 in FIG. 6), the luminance values at 60 Hz, luminance values at 90 Hz before calibration, and luminance values at 90 Hz after calibration are identical, as is indicated by the corresponding matching triangles, circles and crosses. However, the luminance values at 60 Hz and 90 Hz appear to be distinct for gray levels 18 to 50. Accordingly, the luminance values at 90 Hz are adjusted for these input gray levels, and the corresponding crosses and triangles appear to be identical, indicating that the adjusted luminance values at 90 Hz are close to the luminance values at 60 Hz for these input gray levels.

Figure 8:
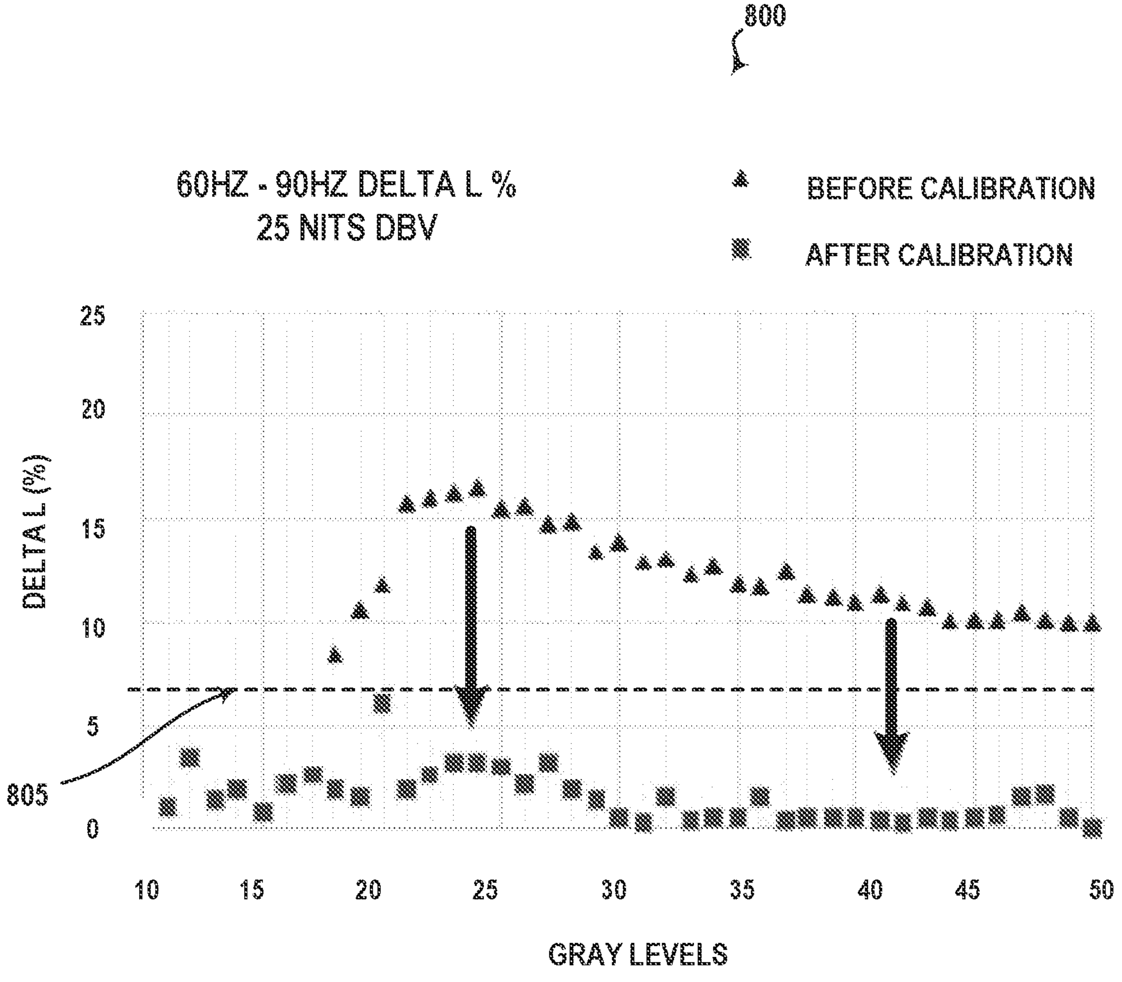
FIG. 8 is a graph illustrating delta luminance values before and after calibration, in accordance with example embodiments.

FIG. 8 is a graph illustrating delta luminance values before and after calibration, in accordance with example embodiments. Graph 800 is a graphical representation of delta luminance values for a DBV band of 25 nits, before and after calibration. For example, these values may correspond to delta luminance values displayed in lookup table 600 of FIG. 6. The horizontal axis corresponds to input gray levels ranging from 11 to 50 (as displayed in column C1 of lookup table 600), and the vertical axis corresponds to delta luminance values in percentages. Delta luminance values at 90 Hz before calibration (corresponding to values in column C6 of lookup table 600 of FIG. 6) are represented by triangles, and delta luminance values at 90 Hz after calibration (corresponding to values in column C7 of lookup table 600 of FIG. 6) are represented by squares. As indicated, for input gray levels 11 to 17 (corresponding to gray levels in block 625 in FIG. 6), the luminance values at 90 Hz are not adjusted, and the delta luminance values remain unchanged. However, the delta luminance values at 90 Hz before and after calibration appear to be distinct for gray levels 18 to 50. A threshold (e.g., at 6%), as indicated by line 805 indicates how the gray levels at 90 Hz with delta luminance values that exceed the threshold (e.g., of 6%) can be adjusted to reduce the delta luminance values to be less than the desired threshold.

Similar techniques may be used when the display panel transitions from a second refresh rate to a third refresh rate. For example, the optical property of the display panel can be measured for the input gray levels at a third refresh rate. For example, when transitioning from 90 Hz to 120 Hz, luminance values at 120 Hz can be measured for input gray levels, and a column of values similar to column C3 of FIG. 6 may be generated. This would provide a second plurality of candidate gray levels. Similar to the processes described herein, for a given input gray level, the luminance values at 120 Hz can be compared to the luminance values at 90 Hz, and based on the corresponding gray level (e.g., at 90 Hz) for the input gray level and the second plurality of candidate gray levels at the third refresh rate (e.g., 120 Hz), a second corresponding gray level for the input gray level can be selected. The mapping between the input gray level, corresponding gray level, and second corresponding gray level can be stored. During runtime, the device is configured to adjust the input display data using the second corresponding gray level for the input gray level when the display panel is transitioning from the second refresh rate to the third refresh rate.

III. Example Modifications of Gamma Values

Measurements of the optical property at input gray levels and candidate gray levels can be performed for specific DBV bands. In some embodiments, such measurements can be performed for all input gray levels at the selected DBV band. Also, for example, in some embodiments, after measurements are performed, delta luminance values may be determined, and DBV bands and input gray levels can be identified based on when the delta luminance values exceed a predetermined threshold.

Referring to FIG. 1, some brightness settings at certain DBV bands may remain unchanged. For example, the unshaded cells in table 100 correspond to brightness levels that do not need to be changed. Generally, such luminance levels correspond to higher DBV bands and higher gray level tap points. For example, at tap point 255, none of the brightness settings need to be adjusted.

In some embodiments, the input gray level may be based on determining that an optical property is less than an optical threshold. Referring again to FIG. 1, the optical threshold can be a luminance value of 0.055 nits. Accordingly, at tap point G7, input gray levels at DBV bands 1 to 6 may be identified for adjustment. Similarly, at tap point G15, input gray levels at DBV bands 1 to 4 may be identified for adjustment, at tap point G23, input gray levels at DBV bands 1 to 3 may be identified for adjustment, and so forth. These cells correspond to the cells of the third type with low brightness settings, and are indicated with a shading comprising horizontal lines.

In some embodiments, when the optical property exceeds the optical threshold, a different technique for adjustment may be applied. Referring again to FIG. 1, at tap point G7 and DBV band 7, the brightness value is 0.184 which exceeds the example optical threshold of 0.055. As another example, at DBV band 5, and at tap points G15 and G23, the respective luminance values are 0.098 and 0.251, which exceed the example optical threshold of 0.055. These cells correspond to the cells of the second type with intermediate brightness settings, and are indicated with a shading comprising vertical lines. Accordingly, for input gray levels at these brightness settings, the techniques disclosed herein may be applied. However, another set of techniques may also be applied to calibrate the optical property, as described below.

To make refresh rate changes between 60 Hz and 90 hz appear less conspicuous to users, it may be desirable to modify the gamma values in a gamma table (e.g., table 100 of FIG. 1) so that the delta luminances between 60 Hz and 90 Hz, on average, decrease across selected input gray levels. Because human eyes are highly sensitive to changes at low luminance settings, some embodiments may involve modifying gamma values only for threshold low input gray levels; for instance, only for input gray levels at or below G48.

Figure 9:
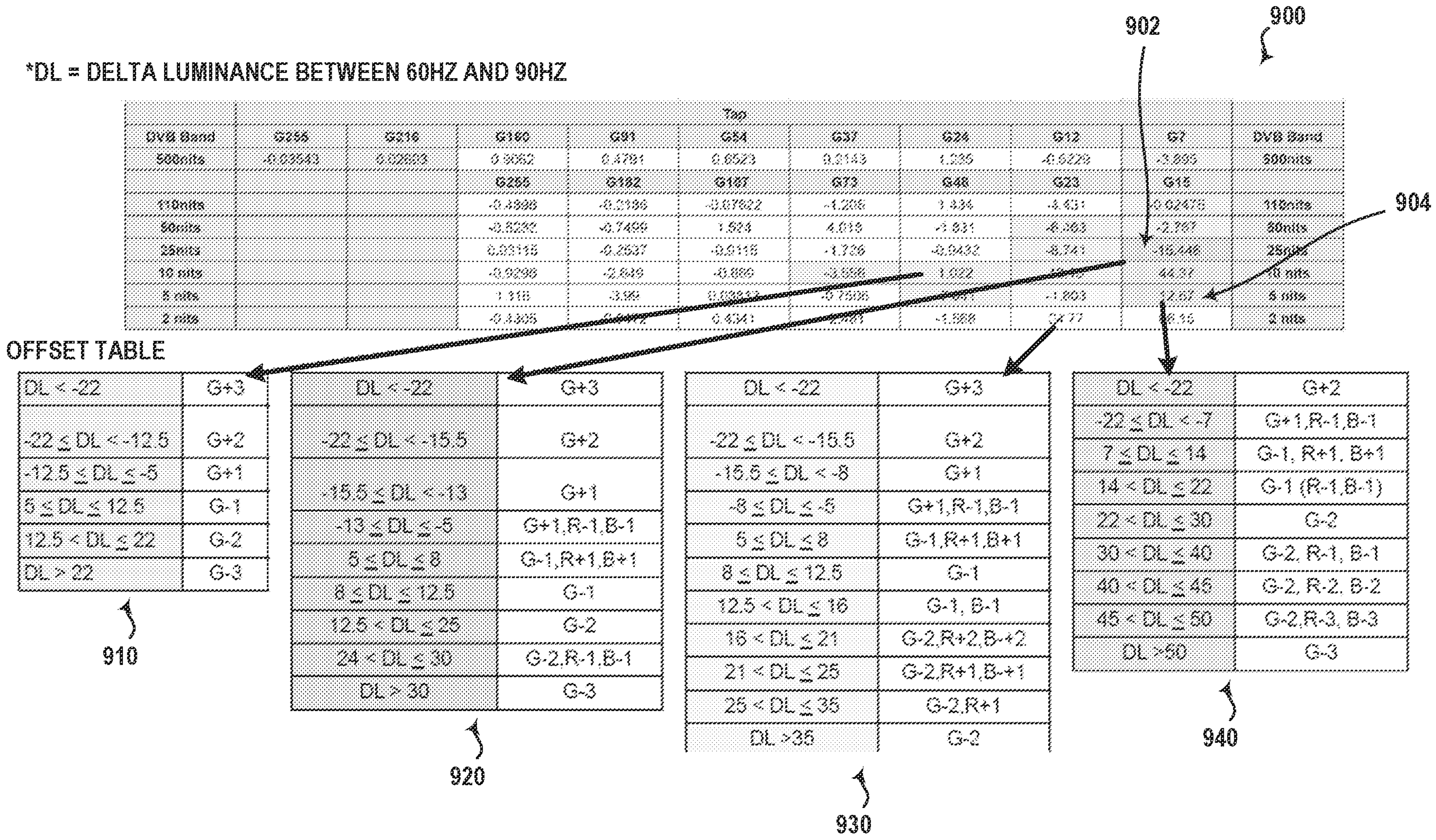
FIG. 9 depicts offset tables, in accordance with example embodiments.

To modify gamma values of tap points in table 100, some implementations involve altering one or more register values in display adjustment circuitry 1020 of FIG. 9. For instance, display adjustment circuitry 1020 could include a set of hardware registers for each tap point in table 100. Display adjustment circuitry 1020 could use the values in these registers to alter the input gray levels signals sent by controller 1060 to display panel 1010. Generally speaking, the number of hardware registers for a given tap point corresponds to the number of color channels used by display panel 1010. For example, if display panel 1010 used RGB color channels, then display adjustment circuitry 1020 may contain three hardware registers for a given tap point, each of the three registers corresponding to one of the RGB color channels.

In order to modify gamma values in table 100, an offset could be applied so that, for a given color channel, the register values at refresh rate 60 Hz become similar to the register values at refresh rate 90 Hz. The magnitude of this offset may be determined based on delta luminance values. For example, if the delta luminance between 60 Hz and 90 Hz for an input gray level is 25%, then the register value for the green color channel at 90 Hz is significantly higher than the register value for the green color channel at 60 Hz. Thus, a larger offset may be applied. Alternatively, if the delta luminance between 60 Hz and 90 Hz for an input gray level is 10%, then the register value for the green color channel at 90 Hz is relatively similar to the register value for the green color channel at 60 Hz, and thus a smaller offset value may be applied.

In some embodiments, at least one difference in the optical property of the display panel between the first refresh rate and the second refresh rate for an input gray level can be measured. Generally, magnitudes of gamma offsets may differ depending on the delta luminance (or another measured difference in an optical property) for an input gray level. Some embodiments may involve a series of offset tables that detail the offset value that should be applied for various delta luminances. In some implementations, these offset tables are determined based on analysis of devices that contain similar display panels to display panel 1010 (perhaps devices that were developed by the same manufacturer that developed display panel 1010).

FIG. 9 includes various example offset tables, in accordance with example embodiments. Namely, FIG. 9 includes four offset tables: offset table 910, offset table 920, offset table 930, and offset table 940. Each of these offset tables could be used to identify the offset values that should be applied for various delta luminances in delta luminance table 900.

In some embodiments, based on the at least one measured difference, a value offset to a default gamma value used by the device for the input gray level can be applied when the display panel is operating at the second refresh rate, thereby generating a new gamma value. In some embodiments, the display panel may have a plurality of color channels, and the default gamma value may include respective register values for the plurality of color channels. In such instances, the value offset can include an offset to at least one of the register values of the default gamma value. The plurality of color channels can include red, green and blue (RGB) color channels. For example, delta luminance 902 is the delta luminance for DVB-DBV band 4/input gray level G15. Upon determining that the value for delta luminance 902 is −15.446, offset table 920 could be used to determine that the value of −15.446 falls in the range [−15.5, −13], and thus an offset value of 1 should be applied to the green color channel register value of DBV band 4/input gray level G15 at 90 Hz. As another example, delta luminance 904 is the delta luminance for DBV band 2/input gray level G15. Upon determining that the value for delta luminance 904 is 12.67, offset table 940 could be used to determine that the value of 12.67 falls in the range [7, 14], and thus an offset value of −1 should be applied to the green color channel register of DBV band 2/input gray level G15 at 90 Hz, an offset value of 1 should be applied to the red color channel register of DBV band 2/input gray level G15 at 90 Hz, and an offset value of 1 should be applied to the blue color channel register of DBV band 2/input gray level G15 at 90 Hz.

In some embodiments, the new gamma value is stored in the device, wherein subsequent to the storing, the device is configured to override the default gamma value for the second input gray level with the new gamma value when the display panel is operating at the second refresh rate. In some embodiments, the process of updating register values for an input gray level occurs until the delta luminance for the input gray level is less than a predefined threshold. In some examples, the predefined threshold in a range between 5% and 95%. For instance the predefined threshold may be 5%, 10%, or 90%.

In certain embodiments, the process of updating register values for an input gray level occurs until: (i) the delta luminance for the input gray level is less than a predefined threshold, and (ii) the delta color difference for the input gray level is less than a predefined color threshold, where the color difference is measured as a linear combination of the squared difference between the u' at 90 Hz and at 60 Hz and the squared difference between the v' at 90 Hz and at 60 Hz, where u' and v' are color coordinates in CIELUV color space. For example, the color difference can be measured as:

$$\Delta(u',v')=\sqrt{(u'_{90Hz}-u'_{60Hz})^2+(v'_{90Hz}-v'_{60Hz})^2} \quad \text{(Eqn. 3)}$$

In some instances, the predefined color threshold is 0.4%, i.e., it may be desirable to keep Δ(u', v') to be less than 0.004. In some instances, even if delta luminance is small, but the color difference is big, an optical defect may remain perceptible. Accordingly, to achieve better results, in some embodiments, both luminance and color may need to be adjusted. During measurements of an optical property, both luminance and color changes can be recorded and/or monitored. The color difference can be measured similar to how a delta luminance is measured.

IV. Example Devices

Figure 10:
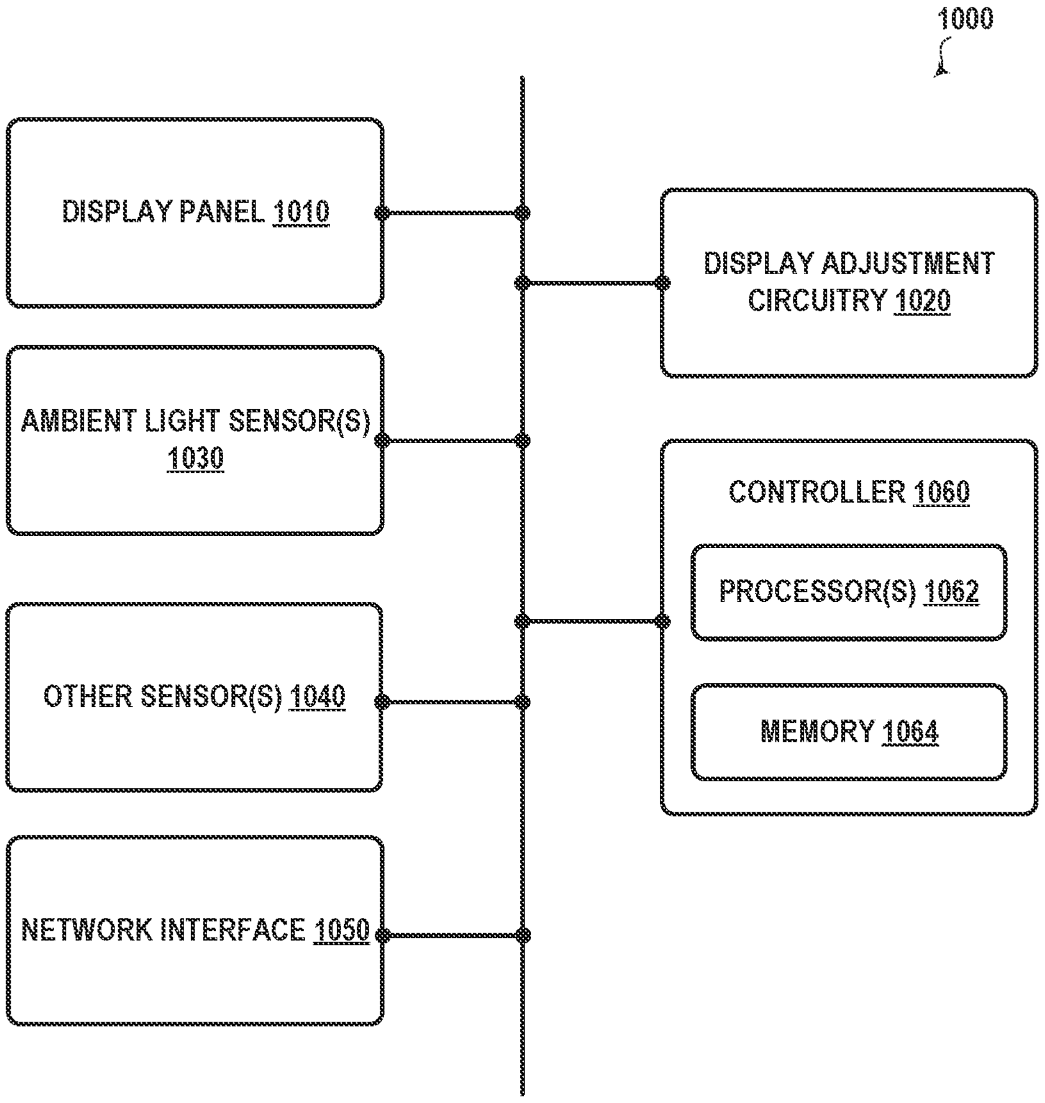
FIG. 10 illustrates a computing device, in accordance with example embodiments.

FIG. 10 illustrates computing device 1000, in accordance with example embodiments. Computing device 1000 includes display panel 1010, display adjustment circuitry 1020, one or more ambient light sensors 1030, one or more other sensors 1040, network interface 1050, and controller 1060. In some examples, computing device 1000 may take the form of a desktop device, a server device, or a mobile device. Computing device 1000 may be configured to interact with an environment. For example, computing device 1000 may obtain environmental state measurements associated with an environment around computing device 1000 (e.g., temperature measurements, ambient light measurements, etc.).

Display panel 1010 may be configured to provide output signals to a user by way of one or more screens (including touch screens), cathode ray tubes (CRTs), liquid crystal displays (LCDs), light emitting diodes (LEDs), displays using digital light processing (DLP) technology, and/or other similar technologies. Display panel 1010 may also be configured to generate audible outputs, such as with a speaker, speaker jack, audio output port, audio output device, earphones, and/or other similar devices. Display panel 1010 may further be configured with one or more haptic components that can generate haptic outputs, such as vibrations and/or other outputs detectable by touch and/or physical contact with computing device 1000.

In example embodiments, display panel 1010 is configured to provide output signals at a given refresh rate. The refresh rate may correspond to the number of times display panel 1010 updates with new content each second. For example, a 60 Hz refresh rate may mean that display panel 1010 updates 60 times per second. In example embodiments, display panel 1010 may operate at a 60 Hz, a 90 Hz, or a 120 Hz refresh rate, among other possibilities.

In certain embodiments, display panel 1010 may be a color display utilizing a plurality of color channels for generating images. For example, display panel 1010 may utilize red, green, and blue (RGB) color channels, or cyan, magenta, yellow, and black (CMYK) color channels, among other possibilities. As described herein, display adjustment circuitry 1020 may adjust input display data using a corresponding gray level for the input gray level when the display panel is transitioning from the first refresh rate to the second refresh rate. As further described herein, display adjustment circuitry 1020 may adjust the gamma characteristics for each of the color channels of display panel 1010, as described with reference to FIG. 9.

In some embodiments, display panel 1010 may include a plurality of pixels disposed in a pixel array defining a plurality of rows and columns. For example, if display panel 1010 had a resolution of 1024×600, each column of the array may include 600 pixels and each row of the array may include 1024 groups of pixels, with each group including a red, blue, and green pixel, thus totaling 3072 pixels per row. In example embodiments, the color of a particular pixel may depend on a color filter that is disposed over the pixel.

In example embodiments, display panel 1010 may receive image data from controller 1060 and correspondingly send signals to its pixel array in order to display the image data. To send image data to display panel 1010, controller 1060 may first convert a digital image into numerical data that can be interpreted by display panel 1010. For instance, a digital image may contain various image pixels that correspond to respective pixels of display panel 1010. Each image pixel of the digital image may have a numerical value that represents the luminance (e.g., brightness or darkness) of the digital image at a particular spot. These numerical values may be referred to as "gray levels." The number of gray levels may depend on the number of bits used to represent the numerical values. For example, if 8 bits were used to represent a numerical value, display panel 1010 may provide 256 gray levels, with a numerical value of 0 corresponding to full black and a numerical value of 255 corresponding to full white. As a more specific example, controller 1060 may provide to display panel 1010 a digital image stream containing 24 bits, with 8 bits corresponding to a gray level for each of the red, green, and blue color channels of a pixel group.

In some cases, the luminance characteristics of images displayed by display panel 1010 may be depicted inaccurately when perceived by users. Such inaccuracies may result from the non-linear response of the human eye and could cause inaccurate portrayals of color/luminance on display panel 1010 from the viewpoint of users. To compensate for such inaccuracies, computing device 1000 could use display adjustment circuitry 1020.

Display adjustment circuitry 1020 may include circuitry that could compensate for inaccuracies that occur when displaying images on display panel 1010. To do this, display adjustment circuitry may include memory for storing one or more gamma curves/tables. The values in each curve/table may be determined based upon the transmittance sensitivities of display panel 1010 over a range of input gray levels.

Figure 11A:
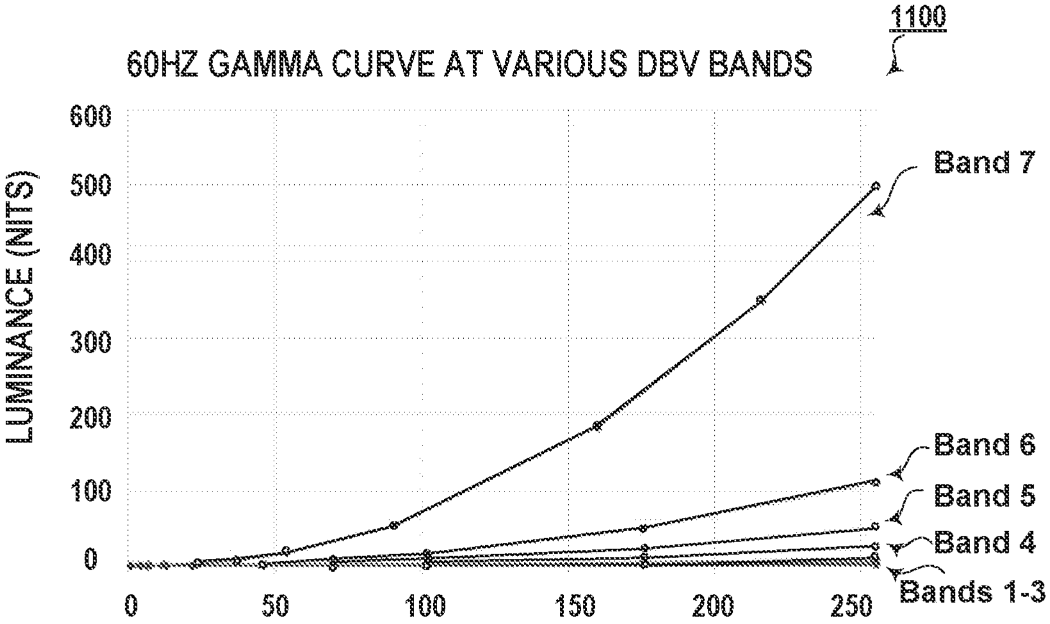
FIG. 11A is a graph illustrating 60 Hz gamma curves for various DBV bands, in accordance with example embodiments.

As an illustrative example, FIG. 11A depicts graph 1100 that includes various gamma curves. Each gamma curve may correspond to a display brightness value (DBV) band. The use of a particular DBV band (and thus a particular gamma curve) may be based on user input. For instance, a user may select, perhaps by interacting with a brightness adjustment bar, a maximum brightness for display panel 1010. Based on that maximum brightness, display panel 1010 may choose a corresponding DBV band (and thus a corresponding gamma curve) to compensate for inaccuracies that occur when displaying images.

As shown in graph 1100, each gamma curve includes a relationship between input gray levels (on the x-axis) and luminance of a viewable image displayed on display panel 1010 (on the y-axis). These relationships are non-linear. For instance, in band 7, an input gray level of 1100 corresponds to a luminance value of 300 nits. Consequently, by using a gamma curve to adjust input gray levels, the images displayed on display panel 1010 may exhibit a non-linear luminance to input gray level relationship. Yet, when viewed by a user, the response of the human eye may cause the user to perceive the displayed images as having a linear relationship between luminance and input gray level. Thus, by using gamma curves, display panel 1010 is able to produce images that may be perceived by a user as having a generally linear relationship with regard to input gray level and luminance.

Figure 11B:
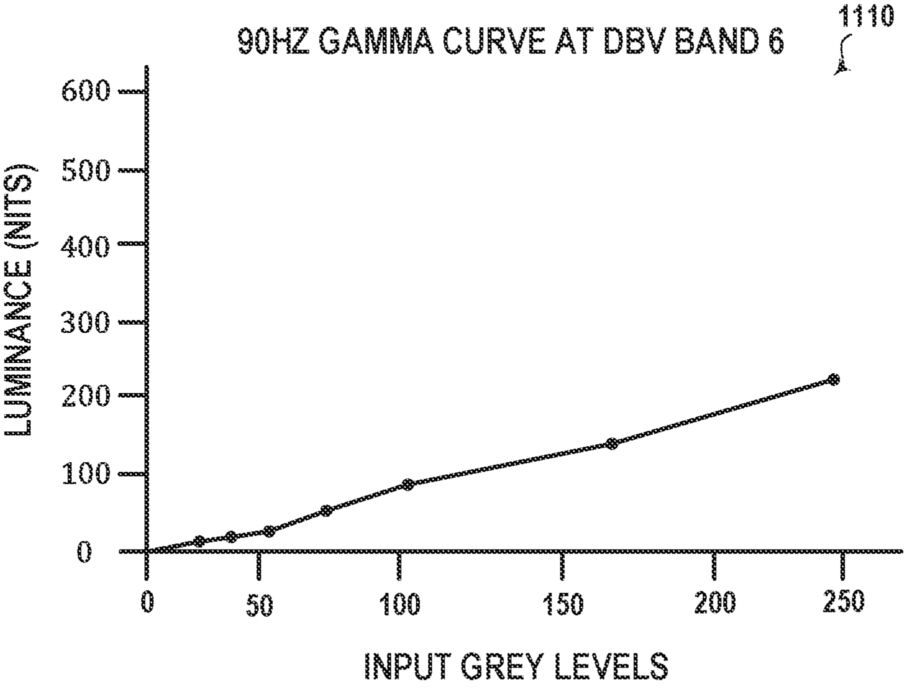
FIG. 11B is a graph illustrating a 90 Hz gamma curve for DBV band 6, in accordance with example embodiments.

Display panel 1010 could use different gamma curves depending on whether display panel 1010 is operating at a first refresh rate (e.g., 60 Hz) or at a second refresh rate (e.g., 90 Hz). For instance, display panel 1010 may utilize the gamma curves shown in graph 1100 when it is operating at 60 Hz. On the other hand, display panel 1010 may utilize the gamma curve shown in graph 1110 of FIG. 11B when it is operating at 90 Hz. For the purpose of clarity, graph 1110 only includes the gamma curve for DBV band 6. However, it should be noted that graph 1110 could contain other gamma curves for other DBV bands as well.

The gamma curves for 60 Hz may differ from the gamma curves for 90 Hz. For example, the gamma curve for DBV band 6 in graph 1100 differs from the gamma curve for DBV band 6 in graph 1110. More specifically, the gamma curve for DBV band 6 in graph 1110 has, on average, higher luminance values for input gray levels than the gamma curve for DBV band 6 in graph 1100. In line with the discussion above, this difference may cause a visual flicker to manifest on display panel 1010 when display panel 1010 transitions between 60 Hz to 90 Hz (and vice versa). Consequently, if the display panel 1010 frequently switches between 60 Hz and 90 Hz refresh rates, the visual flicker may become highly pronounced and detrimental to a user's experience. Further, because human eyes are highly sensitive at low luminance settings, the visual flicker is especially noticeable when the luminance of display panel 1010 is low.

Returning back to FIG. 10, ambient light sensor(s) 1030 may be configured to receive light from an environment of (e.g., within 1 meter (m), 5 m, or 10 m of) computing device 1000. Ambient light sensor(s) 1030 may include one or more single photon avalanche detectors (SPADs), avalanche photodiodes (APDs), complementary metal oxide semiconductor (CMOS) detectors, and/or charge-coupled devices (CCDs). For example, ambient light sensor(s) 1030 may include indium gallium arsenide (InGaAs) APDs configured to detect light at wavelengths around 1550 nanometers (nm). Other types of ambient light sensor(s) 1030 are possible and contemplated herein.

In some embodiments, ambient light sensor(s) 1030 may include a plurality of photodetector elements disposed in a one-dimensional array or a two-dimensional array. For example, ambient light sensor(s) 1030 may include sixteen detector elements arranged in a single column (e.g., a linear array). The detector elements could be arranged along, or could be at least parallel to, a primary axis.

In some embodiments, computing device 1000 can include one or more other sensors 1040. Other sensor(s) 1040 can be configured to measure conditions within computing device 1000 and/or conditions in an environment of (e.g., within 1 m, 5 m, or 10 m of) computing device 1000 and provide data about these conditions. For example, other sensor(s) 1040 can include one or more of: (i) sensors for obtaining data about computing device 1000, such as, but not limited to, a thermometer for measuring a temperature of computing device 1000, a battery sensor for measuring power of one or more batteries of computing device 1000, and/or other sensors measuring conditions of computing device 1000; (ii) an identification sensor to identify other objects and/or devices, such as, but not limited to, a Radio Frequency Identification (RFID) reader, proximity sensor, one-dimensional barcode reader, two-dimensional barcode (e.g., Quick Response (QR) code) reader, and/or a laser tracker, where the identification sensor can be configured to read identifiers, such as RFID tags, barcodes, QR codes, and/or other devices and/or objects configured to be read, and provide at least identifying information; (iii) sensors to measure locations and/or movements of computing device 1000, such as, but not limited to, a tilt sensor, a gyroscope, an accelerometer, a Doppler sensor, a Global Positioning System (GPS) device, a sonar sensor, a radar device, a laser-displacement sensor, and/or a compass; (iv) an environmental sensor to obtain data indicative of an environment of computing device 1000, such as, but not limited to, an infrared sensor, an optical sensor, a biosensor, a capacitive sensor, a touch sensor, a temperature sensor, a wireless sensor, a radio sensor, a movement sensor, a proximity sensor, a radar receiver, a microphone, a sound sensor, an ultrasound sensor and/or a smoke sensor; and/or (v) a force sensor to measure one or more forces (e.g., inertial forces and/or G-forces) acting about computing device 1000, such as, but not limited to one or more sensors that measure: forces in one or more dimensions, torque, ground force, friction, and/or a zero moment point (ZMP) sensor that identifies ZMPs and/or locations of the ZMPs. Many other examples of other sensor(s) 1040 are possible as well.

Data gathered from ambient light sensors(s) 130 and other sensor(s) 1040 may be communicated to controller 1060, which may use the data to perform one or more actions.

Network interface 1050 can include one or more wireless interfaces and/or wireline interfaces that are configurable to communicate via a network. Wireless interfaces can include one or more wireless transmitters, receivers, and/or transceivers, such as a Bluetooth™ transceiver, a Zigbee® transceiver, a Wi-Fi™ transceiver, a WiMAX™ transceiver, and/or other similar types of wireless transceivers configurable to communicate via a wireless network. Wireline interfaces can include one or more wireline transmitters, receivers, and/or transceivers, such as an Ethernet transceiver, a Universal Serial Bus (USB) transceiver, or similar transceiver configurable to communicate via a twisted pair wire, a coaxial cable, a fiber-optic link, or a similar physical connection to a wireline network.

In some embodiments, network interface 1050 can be configured to provide reliable, secured, and/or authenticated communications. For each communication described herein, information for facilitating reliable communications (e.g., guaranteed message delivery) can be provided, perhaps as part of a message header and/or footer (e.g., packet/message sequencing information, encapsulation headers and/or footers, size/time information, and transmission verification information such as cyclic redundancy check (CRC) and/or parity check values). Communications can be made secure (e.g., be encoded or encrypted) and/or decrypted/decoded using one or more cryptographic protocols and/or algorithms, such as, but not limited to, Data Encryption Standard (DES), Advanced Encryption Standard (AES), a Rivest-Shamir-Adelman (RSA) algorithm, a Diffie-Hellman algorithm, a secure sockets protocol such as Secure Sockets Layer (SSL) or Transport Layer Security (TLS), and/or Digital Signature Algorithm (DSA). Other cryptographic protocols and/or algorithms can be used as well or in addition to those listed herein to secure (and then decrypt/decode) communications.

Controller 1060 may include one or more processors 1062 and memory 1064. Processor(s) 1062 can include one or more general purpose processors and/or one or more special purpose processors (e.g., display driver integrated circuit (DDIC), digital signal processors (DSPs), tensor processing units (TPUs), graphics processing units (GPUs), application specific integrated circuits (ASICs), etc.). Processor(s) 1062 may be configured to execute computer-readable instructions that are contained in memory 1064 and/or other instructions as described herein.

Memory 1064 may include one or more non-transitory computer-readable storage media that can be read and/or accessed by processor(s) 1062. The one or more non-transitory computer-readable storage media can include volatile and/or non-volatile storage components, such as optical, magnetic, organic or other memory or disc storage, which can be integrated in whole or in part with at least one of processor(s) 1062. In some examples, memory 1064 can be implemented using a single physical device (e.g., one optical, magnetic, organic or other memory or disc storage unit), while in other examples, memory 1064 can be implemented using two or more physical devices.

In example embodiments, processor(s) 1062 are configured to execute instructions stored in memory 1064 so as to carry out operations.

The operations may include identifying an input gray level while display panel 1010 is operating at a first refresh rate.

The operations may further include retrieving, from a storage (e.g., memory 1064) at the computing device 1000, a corresponding gray level for the input gray level. The corresponding gray level may have been selected from a plurality of candidate gray levels based on a measured optical property of display panel 1010 for the input gray level and the plurality of candidate gray levels at the first refresh rate and at a second refresh rate. For example, an optical property of display panel 1010 for the input gray level at the first refresh rate may have been measured. Also, for example, the optical property of display panel 1010 for a plurality of candidate gray levels at a second refresh rate may have been measured. This may involve measurements by an image capturing device configured to measure the optical property (e.g., a spectroradiometer or a colorimeter) that is different from computing device 1000. In some embodiments, one or more optical properties can be measured.

The operations may also include adjusting input display data using the corresponding gray level for the input gray level.

The operations may also include transitioning, based on the adjusted input display data, display panel 1010 from the first refresh rate to the second refresh rate. For example, controller 1060 may transition display panel 1010 from a 60 Hz refresh rate to a 90 Hz refresh rate, or vice versa.

The operations may further include identifying a rate change triggering event while display panel 1010 is operating at the first refresh rate. The transitioning of display panel 1010 from the first refresh rate to the second refresh rate may be performed in response to the identifying of the rate change triggering event. In some embodiments, the rate change triggering event may be initiated by a process running on the device (e.g., brightness settings for different applications, specified times of day, and so forth). In some embodiments, the rate change triggering event may include a user interaction with display panel 1010 (e.g., a fingerprint detection event where the device attempts to authenticate a fingerprint of a user of the computing device 1000). In some embodiments, the rate change triggering event may be based on an environmental state measurement (e.g., by ambient light sensor(s) 1030, and/or other sensor(s) 1040) associated with an environment around the computing device 1000.

The operations may further include, after transitioning display panel 1010 from the first refresh rate to the second refresh rate, detecting that the rate change triggering event has ended. Then, the operations may include, in response to detecting that the rate change triggering event has ended, transitioning display panel 1010 from the second refresh rate to the first refresh rate.

V. Example Methods

Figure 12:
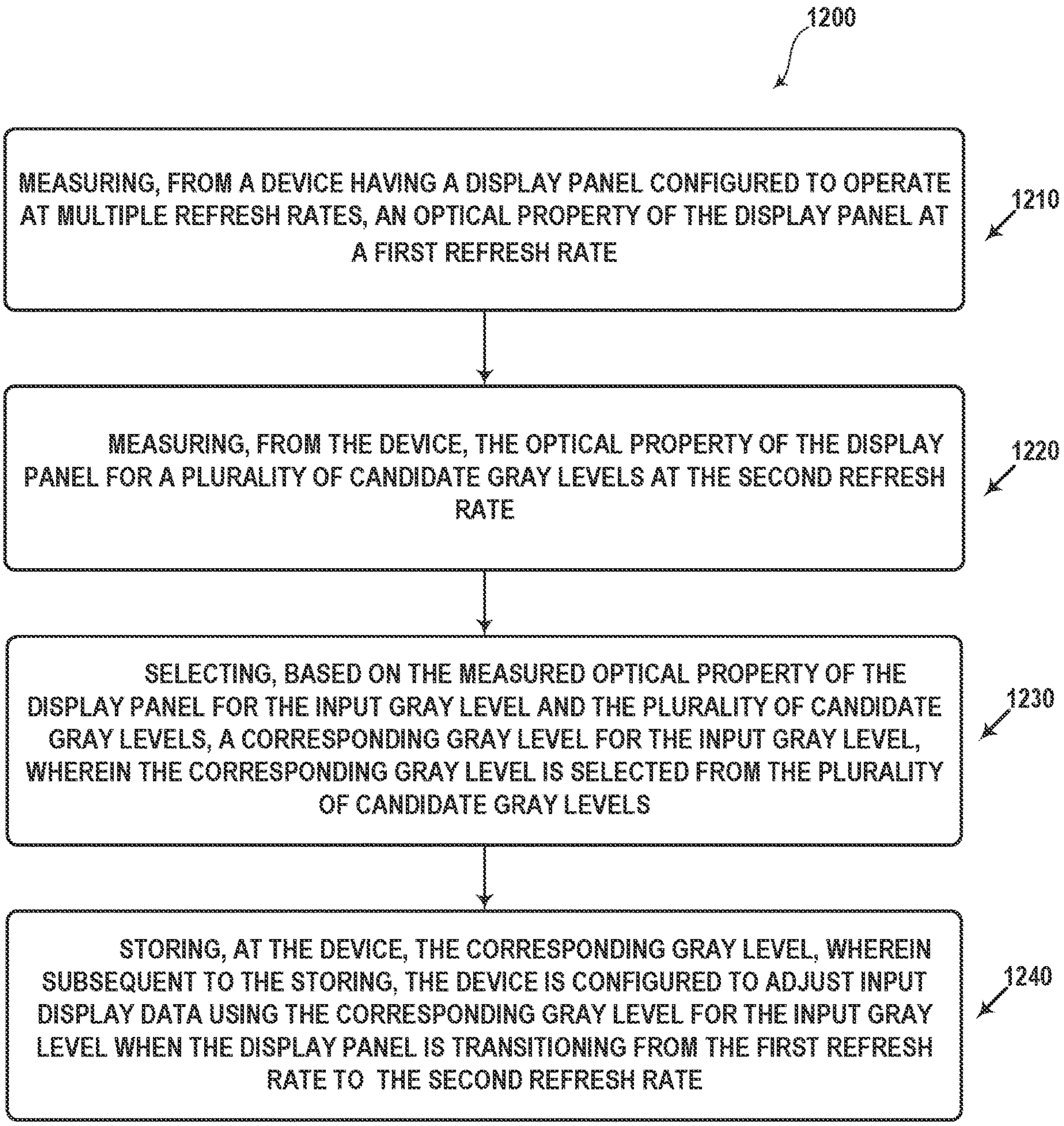
FIG. 12 illustrates a method, in accordance with example embodiments.

FIG. 12 illustrates a method 1200, in accordance with example embodiments. Method 1200 may include various blocks or steps. The blocks or steps may be carried out individually or in combination. The blocks or steps may be carried out in any order and/or in series or in parallel. Further, blocks or steps may be omitted or added to method 1200.

Some or all of the blocks of method 1200 may be carried out by various elements of computing device 1000. Alternatively and/or additionally, some or all of the blocks of method 1200 may be carried out by a computing device that is communicatively coupled to computing device 1000. Furthermore, some implementations of method 1200 may utilize the relationships depicted in graphs and/or tables that are illustrated and described with regard to FIGS. 1 to 9.

Block 1210 includes measuring, for a device having a display panel configured to operate at multiple refresh rates, an optical property of the display panel for an input gray level at a first refresh rate.

Block 1220 includes measuring, for the device, the optical property of the display panel for a plurality of candidate gray levels at a second refresh rate.

Block 1230 includes selecting, based on the measured optical property of the display panel for the input gray level and the plurality of candidate gray levels, a corresponding gray level for the input gray level, wherein the corresponding gray level is selected from the plurality of candidate gray levels.

Block 1240 includes storing, at the device, the corresponding gray level for the input gray level, wherein subsequent to the storing, the device is configured to adjust input display data using the corresponding gray level for the input gray level when the display panel is transitioning from the first refresh rate to the second refresh rate.

In some embodiments, the measuring may be performed for a given display brightness band for the display panel.

Some embodiments involve determining a display brightness band. Such embodiments may also involve determining the input gray level at the determined display brightness band. In some embodiments, the input gray level is based on determining that the optical property is less than an optical threshold.

In some embodiments, a second input gray level may be determined based on a determination that the optical property is greater than an optical threshold. Such embodiments may also involve measuring, from the device, at least one difference in the optical property of the display panel between the first refresh rate and the second refresh rate for the second input gray level. Such embodiments may further involve applying, based on the at least one measured difference, a value offset to a default gamma value used by the device for the second input gray level when the display panel is operating at the second refresh rate, thereby generating a new gamma value. Such embodiments may also involve storing, at the device, the new gamma value wherein subsequent to the storing, the device is configured to override the default gamma value for the second input gray level with the new gamma value when the display panel is operating at the second refresh rate.

In some embodiments, the display panel may have a plurality of color channels. The default gamma value may include respective register values for the plurality of color channels. The value offset may include an offset to at least one of the register values of the default gamma value. In some embodiments, the plurality of color channels may include red, green and blue (RGB) color channels.

In some embodiments, the value offset may be determined, at least in part, based on a default gamma value used by the device for the input gray level when the display panel is operating at the first refresh rate.

In some embodiments, the measuring may be performed by an image capturing device configured to measure the optical property.

In some embodiments, the first refresh rate may be 60 Hz and the second refresh rate may be 90 Hz.

In some embodiments, the optical property may be one of a luminance or a color of the display panel.

In some embodiments, the storing may include storing, in a boot image of the device and for a plurality of input gray levels, a plurality of corresponding gray levels.

Some embodiments involve measuring, for the device, the optical property of the display panel for a second plurality of candidate gray levels at a third refresh rate. Such embodiments may further involve selecting, based on the corresponding gray level for the input gray level and the second plurality of candidate gray levels at the third refresh rate, a second corresponding gray level for the input gray level, wherein the second corresponding gray level is selected from the second plurality of candidate gray levels. Such embodiments may also involve storing, at the device, the second corresponding gray level for the input gray level, wherein subsequent to the storing, the device is configured to adjust the input display data using the second corresponding gray level for the input gray level when the display panel is transitioning from the second refresh rate to the third refresh rate.

Some embodiments involve measuring, from the device, at least one difference in the optical property of the display panel between the first refresh rate and the second refresh rate for a second input gray level. Such embodiments may further involve determining that the least one difference exceeds an optical threshold. Such embodiments may also involve triggering the selecting of the corresponding gray level for the second input gray level.

Figure 13:
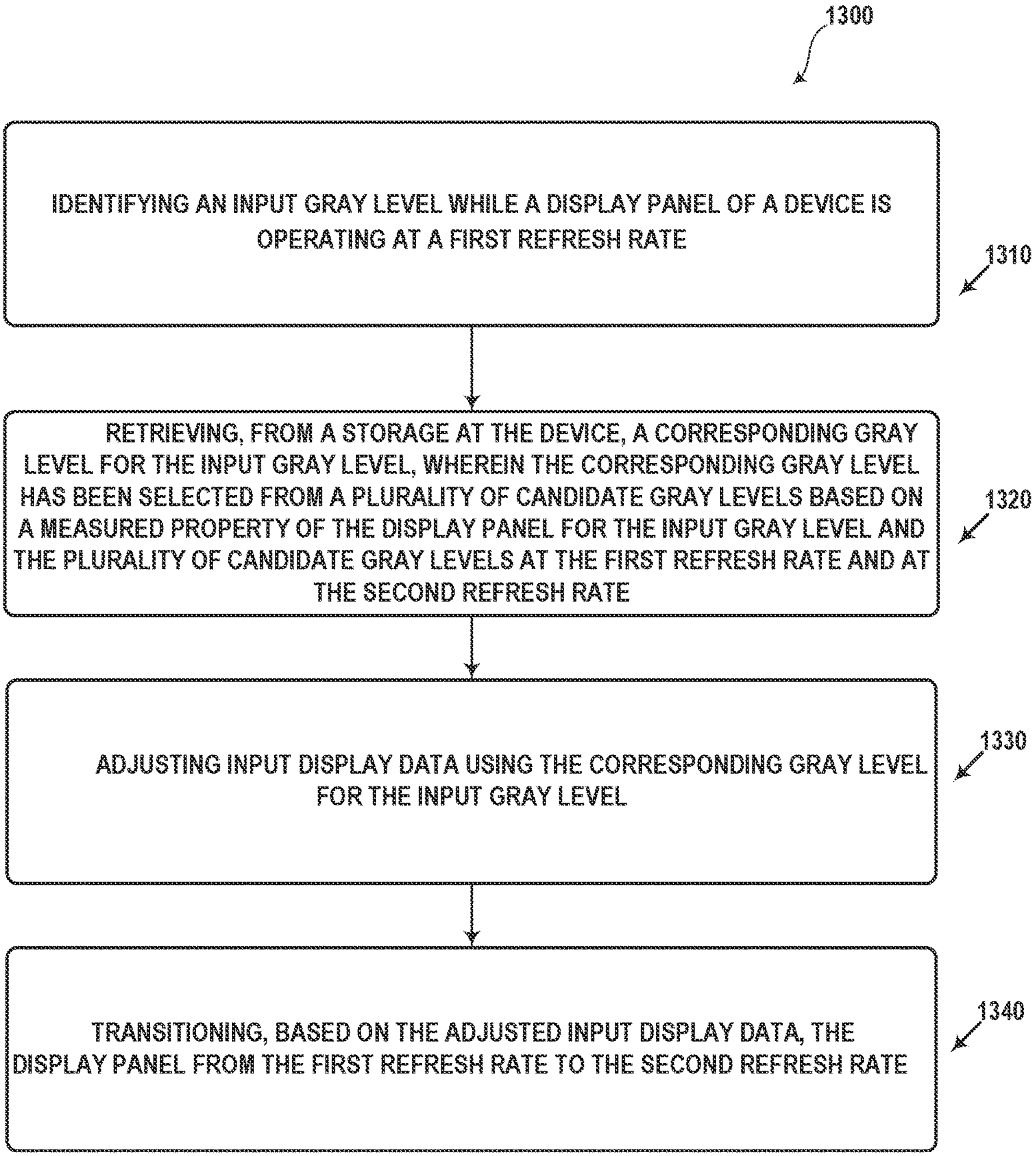
FIG. 13 illustrates another method, in accordance with example embodiments.

FIG. 13 illustrates a method 1300, in accordance with example embodiments. Method 1300 may include various blocks or steps. The blocks or steps may be carried out individually or in combination. The blocks or steps may be carried out in any order and/or in series or in parallel. Further, blocks or steps may be omitted or added to method 1300.

Some or all of the blocks of method 1300 may be carried out by various elements of computing device 1000. Alternatively and/or additionally, some or all of the blocks of method 1300 may be carried out by a computing device that is communicatively coupled to computing device 1000. Furthermore, some implementations of method 1300 may utilize the relationships depicted in graphs and/or tables that are illustrated and described with regard to FIGS. 1 to 9.

Block 1310 includes identifying an input gray level while a display panel of a device is operating at a first refresh rate.

Block 1320 includes retrieving, from a storage at the device, a corresponding gray level for the input gray level, wherein the corresponding gray level has been selected from a plurality of candidate gray levels based on a measured optical property of the display panel for the input gray level and the plurality of candidate gray levels at the first refresh rate and at a second refresh rate.

Block 1330 includes adjusting input display data using the corresponding gray level for the input gray level.

Block 1340 includes transitioning, based on the adjusted input display data, the display panel from the first refresh rate to the second refresh rate.

Some embodiments involve identifying a rate change triggering event while the display panel is operating at the first refresh rate. The transitioning of the display panel from the first refresh rate to the second refresh rate may be performed in response to the identifying of the rate change triggering event.

In some embodiments, the rate change triggering event may be initiated by a process running on the device.

In some embodiments, the rate change triggering event may include a user interaction with the display panel.

In some embodiments, the rate change triggering event may be based on an environmental state measurement associated with an environment around the device.

Some embodiments involve, after transitioning the display panel from the first refresh rate to the second refresh rate, detecting that the rate change triggering event has ended. Such embodiments may also involve, in response to detecting that the rate change triggering event has ended, transitioning the display panel from the second refresh rate to the first refresh rate.

The particular arrangements shown in the Figures should not be viewed as limiting. It should be understood that other embodiments may include more or less of each element shown in a given Figure. Further, some of the illustrated elements may be combined or omitted. Yet further, an illustrative embodiment may include elements that are not illustrated in the Figures.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical functions or actions in the method or technique. The program code and/or related data can be stored on any type of computer readable medium such as a storage device including a disk, hard drive, or other storage medium.

The computer readable medium can also include non-transitory computer readable media such as computer-readable media that store data for short periods of time like register memory, processor cache, and random access memory (RAM). The computer readable media can also include non-transitory computer readable media that store program code and/or data for longer periods of time. Thus, the computer readable media may include secondary or persistent long term storage, like read only memory (ROM), optical or magnetic disks, compact-disc read only memory (CD-ROM), for example. The computer readable media can also be any other volatile or non-volatile storage systems. A computer readable medium can be considered a computer readable storage medium, for example, or a tangible storage device.

While various examples and embodiments have been disclosed, other examples and embodiments will be apparent to those skilled in the art. The various disclosed examples and embodiments are for purposes of illustration and are not intended to be limiting, with the true scope being indicated by the following claims.

What is claimed is:

1. A method comprising:

measuring, from a device having a display panel configured to operate at multiple refresh rates, an optical property of the display panel for an input gray level at a first refresh rate;

measuring, from the device, the optical property of the display panel for a plurality of candidate gray levels at a second refresh rate;

selecting, based on the measured optical property of the display panel for the input gray level and the plurality of candidate gray levels, a corresponding gray level for the input gray level, wherein the corresponding gray level is selected from the plurality of candidate gray levels; and storing, at the device, the corresponding gray level for the input gray level, wherein subsequent to the storing, the device is configured to adjust input display data using the corresponding gray level for the input gray level when the display panel is transitioning from the first refresh rate to the second refresh rate.

2. The method of claim 1, wherein the measuring is performed for a given display brightness band for the display panel.

3. The method of claim 1, further comprising:

determining a display brightness band; and determining the input gray level at the determined display brightness band.

4. The method of claim 3, wherein the input gray level is based on determining that the optical property is less than an optical threshold.

5. The method of claim 3, wherein a second input gray level is determined based on a determination that the optical property is greater than an optical threshold, and the method further comprising:

measuring, from the device, at least one difference in the optical property of the display panel between the first refresh rate and the second refresh rate for the second input gray level;

applying, based on the at least one measured difference, a value offset to a default gamma value used by the device for the second input gray level when the display panel is operating at the second refresh rate, thereby generating a new gamma value; and storing, at the device, the new gamma value wherein subsequent to the storing, the device is configured to override the default gamma value for the second input gray level with the new gamma value when the display panel is operating at the second refresh rate.

6. The method of claim 5, wherein the display panel has a plurality of color channels, wherein the default gamma value comprises respective register values for the plurality of color channels, and wherein the value offset comprises an offset to at least one of the register values of the default gamma value.

7. The method of claim 6, wherein the plurality of color channels comprise red, green and blue (RGB) color channels.

8. The method of claim 5, wherein the value offset is determined, at least in part, based on a default gamma value used by the device for the input gray level when the display panel is operating at the first refresh rate.

9. The method of claim 1, wherein the measuring is performed by an image capturing device configured to measure the optical property.

10. The method of claim 1, wherein the first refresh rate is 60 Hz and wherein the second refresh rate is 90 Hz.

11. The method of claim 1, wherein the optical property is one of a luminance or a color of the display panel.

12. The method of claim 1, wherein the storing comprises storing, in a boot image of the device and for a plurality of input gray levels, a plurality of corresponding gray levels.

13. The method of claim 1, further comprising:

measuring, from the device, the optical property of the display panel for a second plurality of candidate gray levels at a third refresh rate;

selecting, based on the corresponding gray level for the input gray level and the second plurality of candidate gray levels at the third refresh rate, a second corresponding gray level for the input gray level, wherein the second corresponding gray level is selected from the second plurality of candidate gray levels; and storing, at the device, the second corresponding gray level for the input gray level, wherein subsequent to the storing, the device is configured to adjust the input display data using the second corresponding gray level for the input gray level when the display panel is transitioning from the second refresh rate to the third refresh rate.

14. The method of claim 1, further comprising:

measuring, from the device, at least one difference in the optical property of the display panel between the first refresh rate and the second refresh rate for a second input gray level;

determining that the at least one difference exceeds an optical threshold; and triggering the selecting of the corresponding gray level for the second input gray level.

15. A computer-implemented method comprising:

identifying an input gray level while a display panel of a device is operating at a first refresh rate;

retrieving, from a storage at the device, a corresponding gray level for the input gray level, wherein the corresponding gray level has been selected from a plurality of candidate gray levels based on a measured optical property of the display panel of the device for the input gray level and the plurality of candidate gray levels at the first refresh rate and at a second refresh rate;

adjusting input display data using the corresponding gray level for the input gray level; and transitioning, based on the adjusted input display data, the display panel from the first refresh rate to the second refresh rate.

16. The method of claim 15, further comprising:

identifying a rate change triggering event while the display panel is operating at the first refresh rate, and wherein the transitioning of the display panel from the first refresh rate to the second refresh rate is performed in response to the identifying of the rate change triggering event.

17. The method of claim 16, wherein the rate change triggering event is initiated by a process running on the device.

18. The method of claim 16, wherein the rate change triggering event comprises a user interaction with the display panel.

19. The method of claim 16, wherein the rate change triggering event is based on an environmental state measurement associated with an environment around the device.

20. The method of claim 16, further comprising:

after transitioning the display panel from the first refresh rate to the second refresh rate, detecting that the rate change triggering event has ended; and in response to detecting that the rate change triggering event has ended, transitioning the display panel from the second refresh rate to the first refresh rate.

21. A system comprising:

one or more processors; and data storage, wherein the data storage has stored thereon computer-executable instructions that, when executed by the one or more processors, cause the system to carry out operations comprising:

measuring, from a device having a display panel configured to operate at multiple refresh rates, an optical property of the display panel for an input gray level at a first refresh rate;

measuring, from the device, the optical property of the display panel for a plurality of candidate gray levels at a second refresh rate;

selecting, based on the measured optical property of the display panel for the input gray level and the plurality of candidate gray levels, a corresponding gray level for the input gray level, wherein the corresponding gray level is selected from the plurality of candidate gray levels; and storing, at the device, the corresponding gray level for the input gray level, wherein subsequent to the storing, the device is configured to adjust input display data using the corresponding gray level for the input gray level when the display panel is transitioning from the first refresh rate to the second refresh rate.

* * * * *